United States Patent
Kono et al.

(10) Patent No.: US 10,589,176 B2
(45) Date of Patent: Mar. 17, 2020

(54) METHOD OF PROVIDING A VIRTUAL SPACE, MEDIUM FOR CAUSING A COMPUTER TO EXECUTE THE METHOD, AND SYSTEM FOR PROVIDING A VIRTUAL SPACE

(71) Applicant: COLOPL, Inc., Tokyo (JP)

(72) Inventors: Yuki Kono, Tokyo (JP); Naruatsu Baba, Tokyo (JP)

(73) Assignee: COLOPL, INC., Tokyo (JP)

(*) Notice: Subject to any disclaimer, the term of this patent is extended or adjusted under 35 U.S.C. 154(b) by 0 days.

(21) Appl. No.: 16/376,376

(22) Filed: Apr. 5, 2019

(65) Prior Publication Data

US 2019/0232165 A1 Aug. 1, 2019

Related U.S. Application Data

(63) Continuation of application No. 15/619,333, filed on Jun. 9, 2017, now Pat. No. 10,252,162.

(30) Foreign Application Priority Data

Jun. 10, 2016 (JP) .................. 2016-116437
Jun. 10, 2016 (JP) .................. 2016-116444

(51) Int. Cl.
*G06T 19/00* (2011.01)
*A63F 13/5258* (2014.01)
(Continued)

(52) U.S. Cl.
CPC ........ *A63F 13/5258* (2014.09); *A63F 13/212* (2014.09); *A63F 13/25* (2014.09);
(Continued)

(58) Field of Classification Search
None
See application file for complete search history.

(56) References Cited

U.S. PATENT DOCUMENTS 5,872,438 A * 2/1999 Roston .................. B25J 9/1689
                                                318/568.1
7,646,394 B1 * 1/2010 Neely, III ............... G06F 3/011
                                                345/419
(Continued)

FOREIGN PATENT DOCUMENTS

CN       103877726 A    6/2014
JP       2007-116309 A  5/2007
(Continued)

OTHER PUBLICATIONS

Office Action in JP Application No. 2016-116437, dated Oct. 11, 2016. 7pp.
(Continued)

*Primary Examiner* — Said Broome
(74) *Attorney, Agent, or Firm* — Hauptman Ham, LLP

(57) ABSTRACT

A method of providing a virtual space. The method includes defining a virtual space by a processor. The method further includes displaying a field of view of the virtual space on a head mounted display device. The method further includes detecting, by the processor, a motion of the user wearing the head mounted display device. The method further includes determining, by the processor, a flying direction for an object in the virtual space in response to the detected motion. The method further includes flying, by the processor, the object within the virtual space in accordance with the flying direction. The method further includes moving, by the processor, the field of view in the flying direction.

20 Claims, 29 Drawing Sheets

(51) Int. Cl.
  *G06F 3/01* (2006.01)
  *G02B 27/01* (2006.01)
  *A63F 13/212* (2014.01)
  *A63F 13/25* (2014.01)
  *A63F 13/428* (2014.01)
  *G06T 15/20* (2011.01)
  *A63F 13/211* (2014.01)
  *A63F 13/803* (2014.01)
  *A63F 13/213* (2014.01)
  *A63F 13/577* (2014.01)

(52) U.S. Cl.
  CPC .......... *A63F 13/428* (2014.09); *G02B 27/017* (2013.01); *G06F 3/011* (2013.01); *G06F 3/014* (2013.01); *G06T 15/20* (2013.01); *G06T 19/003* (2013.01); *A63F 13/211* (2014.09); *A63F 13/213* (2014.09); *A63F 13/577* (2014.09); *A63F 13/803* (2014.09); *A63F 2250/02* (2013.01); *A63F 2300/8017* (2013.01); *G02B 2027/0187* (2013.01); *G06F 2203/012* (2013.01)

(56) References Cited

U.S. PATENT DOCUMENTS

| | | | |
|---|---|---|---|
| 2002/0113756 A1* | 8/2002 | Tuceryan | G02B 27/017 345/8 |
| 2010/0245365 A1 | 9/2010 | Hato et al. | |
| 2012/0262558 A1 | 10/2012 | Boger et al. | |
| 2013/0201082 A1 | 8/2013 | Larson | |
| 2015/0062122 A1* | 3/2015 | Takeda | A63F 13/525 345/419 |
| 2015/0185825 A1* | 7/2015 | Mullins | G06T 19/006 345/633 |
| 2016/0252729 A1 | 9/2016 | Doucet et al. | |

FOREIGN PATENT DOCUMENTS

| | | |
|---|---|---|
| JP | 2010-237882 A | 10/2010 |
| JP | 2013-39225 A | 2/2013 |
| JP | 2014-38403 A | 2/2014 |
| JP | 5869177 B1 | 2/2016 |
| JP | 2016-158794 A | 9/2016 |

OTHER PUBLICATIONS

Office Action in JP Application No. 2016-116437, dated Feb. 21, 2017. 4pp.
Office Action in JP Application No. 2016-116444, dated Oct. 18, 2016. 7pp.
Notice of Allowance in JP Application No. 2016-116444, dated Mar. 14, 2017. 5pp.
R.A.Earnshaw et al. "Virtual Reality Systems", Mar. 1993, Academic Press, 1st Edition, 282pp.
Office Action in CN Application No. 201780023847.3, dated Jun. 13, 2019. 16pp.
"PS4, Xboxone, PC next generation"Golf Club" new screen" Youku, Thirty-nine machine, Jan. 24, 2014. 6pp URL:https://v.youku.com/v_show/id_XNjY1NzA1MDEy.html?spm=a2h0k.11417342.soresults.dtitle.

* cited by examiner

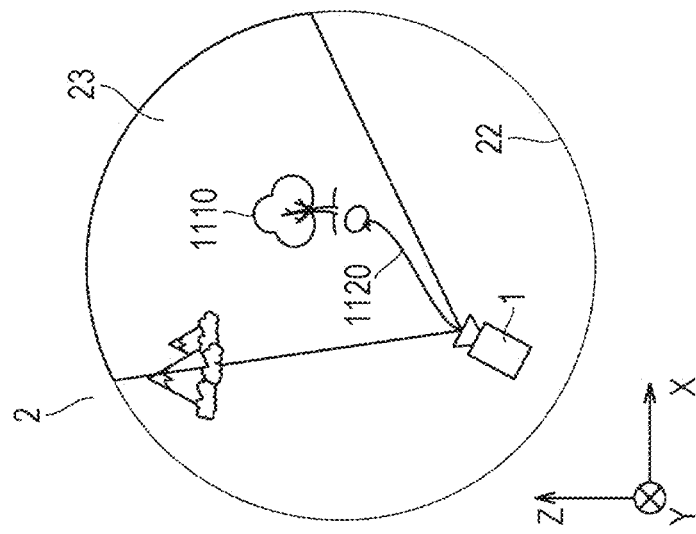
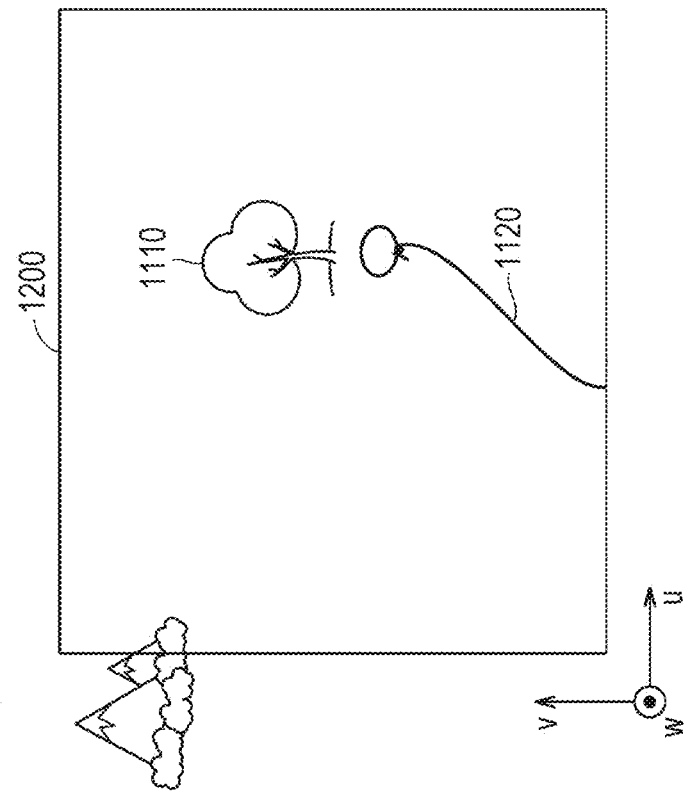

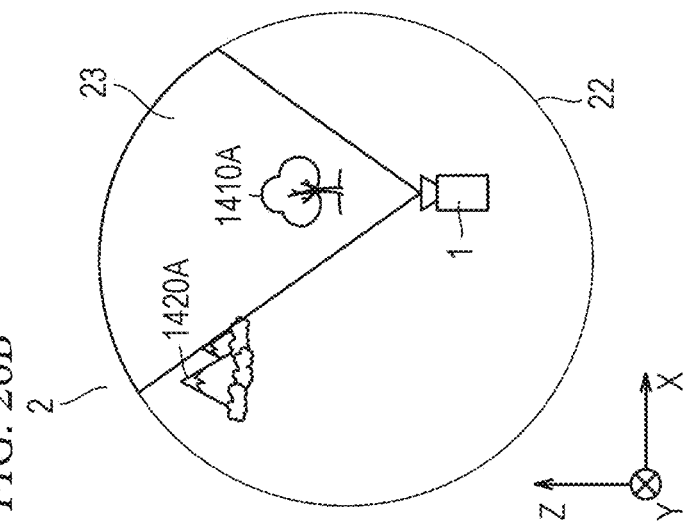
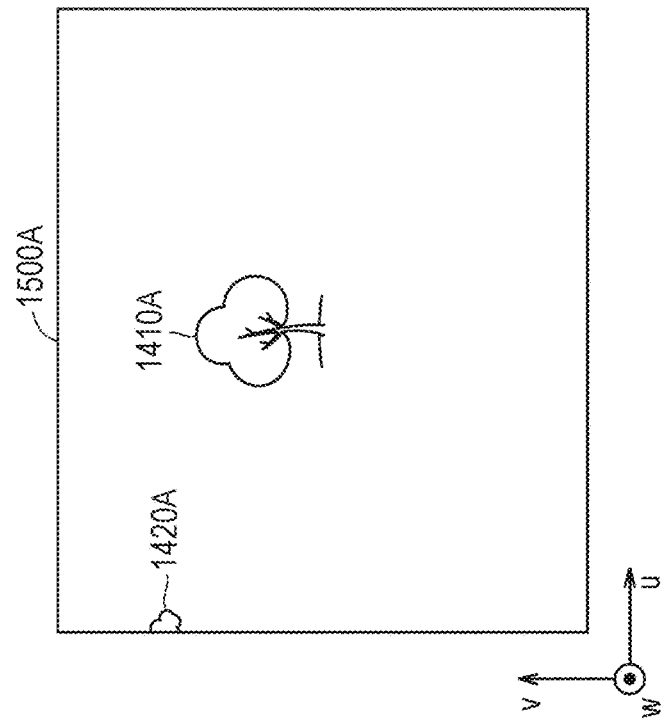
FIG. 26A
FIG. 26B

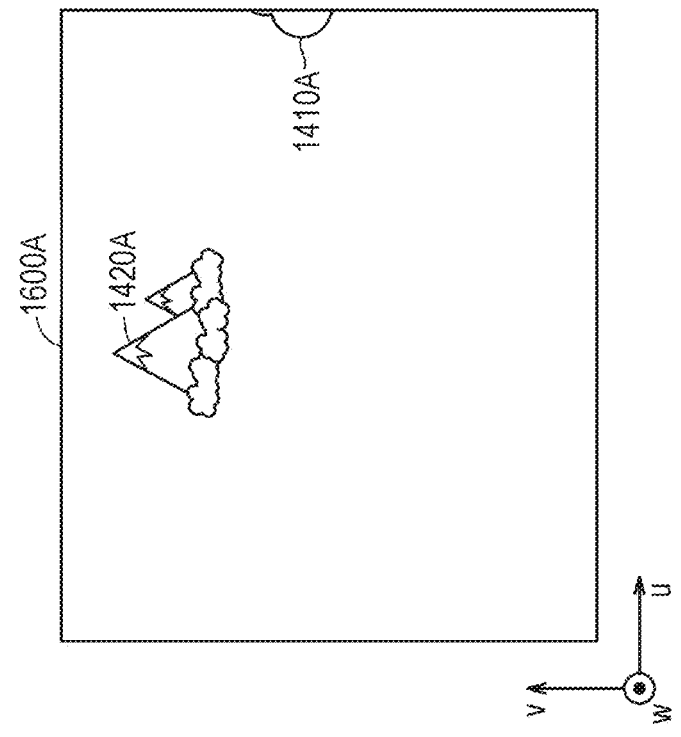
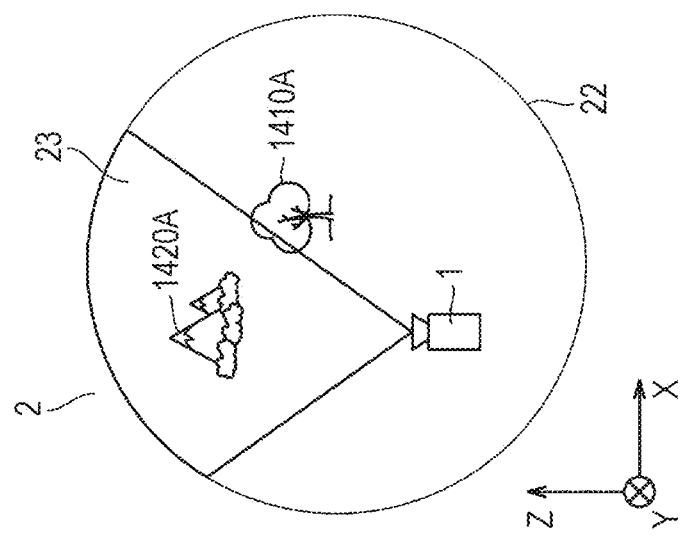

METHOD OF PROVIDING A VIRTUAL SPACE, MEDIUM FOR CAUSING A COMPUTER TO EXECUTE THE METHOD, AND SYSTEM FOR PROVIDING A VIRTUAL SPACE

RELATED APPLICATIONS

The present application is a continuation of U.S. patent application Ser. No. 15/619,333 filed Jun. 9, 2017, which claims priority to Japanese Patent Application Nos. 2016-116437 and 2016-116444 filed Jun. 10, 2016. The disclosures of the above-listed applications are hereby incorporated by reference herein in their entirety.

TECHNICAL FIELD

This disclosure relates to a technology of providing virtual reality, and more specifically, to a technology of helping to reduce a visually induced motion sickness in virtual reality.

BACKGROUND

There is known a technology of providing virtual reality with use of a head mounted display (HMD) device. When virtual reality is provided, a visually induced motion sickness called a virtual reality (VR) sickness may be caused.

For example, in Japanese Patent No, 5869177 (Patent Literature 1), there is disclosed a technology of "generating an image while suppressing the amount of information to be visually recognized by a wearer of a head mounted display when a visual-field image of a virtual space to which a user is immersed is provided to the HMD" (see [Abstract]).

Further, in Japanese Patent Application Laid-open No. 2007-116309 (Patent Literature 2), there is disclosed a technology of "correctly determining motions in directions of panning and tilting executed by a photographer to appropriately control an image blur" (see [Abstract]).

PATENT LITERATURE

[Patent Literature 1] Japanese Patent No. 5,869,177
[Patent Literature 2] Japanese Patent Application Laid-open No. 2007-116309

SUMMARY

As at least one example of the application of the virtual reality, there is a game that utilizes a motion of a user wearing the HMD device, for example, a motion of a hand. Therefore, a technology of helping to reduce the visually induced motion sickness in accordance with the motion of the user is desired.

This disclosure has been made in order to help solve the problem described above, and at least one embodiment has an object in one aspect to provide a method of reducing a visually induced motion sickness (VR sickness) when virtual reality is provided. This disclosure, in at least one embodiment, further has an object in another aspect to provide a medium storing instructions for reducing a visually induced motion sickness when virtual reality is provided. This disclosure, in at least one embodiment, further has an object in another aspect to provide a system for reducing a visually induced motion sickness when virtual reality is provided.

According to at least one embodiment of this disclosure, there is provided a method of providing a virtual space to a head mounted display device by a computer. This method includes defining a virtual space by a processor of the computer. The method further includes determining, by the processor, a flying direction of an object that flies in the virtual space in accordance with a motion of a user of the head mounted display device, based on the motion of the user. The method further includes causing, by the processor, the head mounted display device to display a field of view of the user in the virtual space so that the field of view is moved in the flying direction.

The above-mentioned and other objects, features, aspects, and advantages of this disclosure may be made clear from the following detailed description of this disclosure, which is to be understood in association with the attached drawings.

BRIEF DESCRIPTION OF THE DRAWINGS

FIG. 12A A diagram of a state when the virtual user throws a rope toward a tree according to at least one embodiment of this disclosure.

FIG. 12B A diagram of a state when the virtual user throws a rope toward a tree according to at least one embodiment of this disclosure.

FIG. 26A A diagram of a case where the user maintaining a horizontal state leans to the right side to incline the board or the sled to the right side according to at least one embodiment of this disclosure.

FIG. 26B A diagram of a case where the user maintaining a horizontal state leans to the right side to incline the board or the sled to the right side according to at least one embodiment of this disclosure.

FIG. 27A A diagram of a case where the user maintaining the horizontal state leans to the left side to incline the board or the sled to the left side according to at least one embodiment of this disclosure.

FIG. 27B A diagram of a case where the user maintaining the horizontal state leans to the left side to incline the board or the sled to the left side according to at least one embodiment of this disclosure.

DETAILED DESCRIPTION

Now, with reference to the drawings, embodiments of this disclosure are described in detail. In the following description, like components are denoted by like reference symbols. The same applies to the names and functions of those components. Therefore, detailed description of those components is not repeated.

Figure 1:
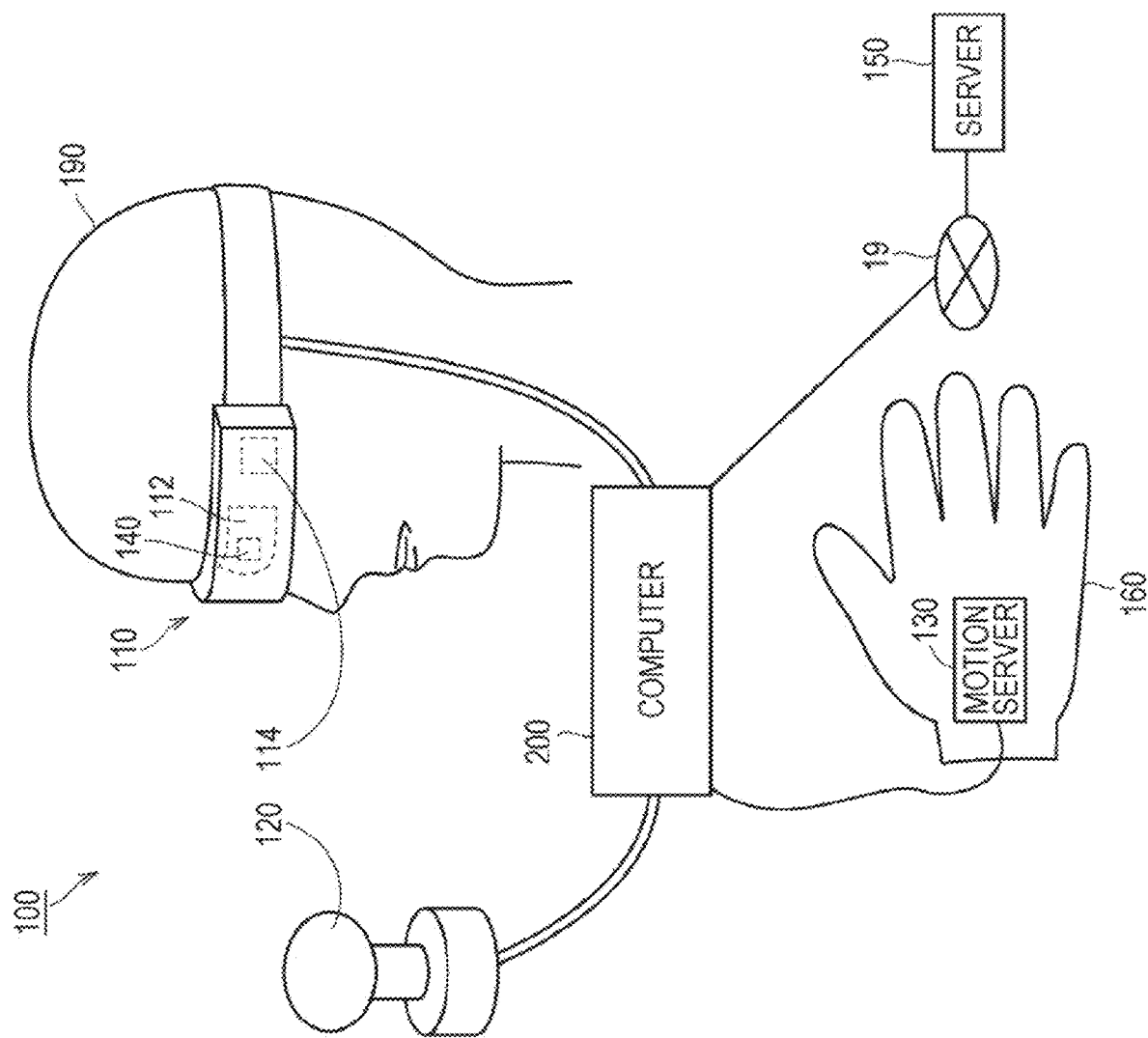
FIG. 1 A diagram of a configuration of a head mounted display (HMD) system according to at least one embodiment of this disclosure.

[Configuration of HMD System] With reference to FIG. 1, a configuration of a head mount display (HMD) system 100 is described. FIG. 1 is a diagram of the configuration of the HMD system 100 according to at least one embodiment of this disclosure. In at least one aspect, the HMD system 100 is provided as a system for household use or a system for professional use.

In FIG. 1, the HMD system 100 according to at least one embodiment of this disclosure includes an HMD device 110, an HMD sensor 120, a controller 160, and a computer 200. The HMD device 110 includes a monitor 112 and an eye gaze sensor 140. The controller 160 includes a motion sensor 130. In at least one aspect, the computer 200 can be connected to a network 19 and can communicate to/from a server 150 connected to the network 19. In at least one aspect, the HMD device 110 may include a sensor 114 instead of the HMD sensor 120.

The HMD device 110 of at least one embodiment of this disclosure may be worn on a head of a user to provide a virtual space to the user during operation. More specifically, the HMD device 110 displays each of a right-eye image and a left-eye image on monitor 112. When each eye of the user visually recognizes each image, the user may recognize the image as a three-dimensional image based on the parallax of both the eyes.

The monitor 112 is achieved as, for example, a non-transmissive display device or a partially transmissive display device. In at least one aspect, the monitor 112 is arranged on a main body of the HMD device 110 so as to be positioned in front of both the eyes of the user. Therefore, when the user visually recognizes the three-dimensional image displayed on the monitor 112, the user can be immersed to the virtual space. According to at least one embodiment of this disclosure, the virtual space includes, for example, a background, objects that can be operated by the user, and menu images that can be selected by the user. According to at least one embodiment of this disclosure, the monitor 112 may be achieved as a liquid crystal monitor or an organic electroluminescence (EL) monitor included in a so-called smart phone or other information display terminals.

In at least one aspect, the monitor 112 may include a sub-monitor for displaying a right-eye image and a sub-monitor for displaying a left-eye image. In at least one aspect, the monitor 112 may be configured to integrally display the right-eye image and the left-eye image. In this case, the monitor 112 includes a high-speed shutter. The high-speed shutter operates so as to enable alternate display of the right-eye image and the left-eye image so that only one of the eyes can recognize the image at any single point in time.

The HMD sensor 120 includes a plurality of light sources (not shown). Each light source is achieved by, for example, an LED configured to emit an infrared ray. The HMD sensor 120 has a position tracking function for detecting the movement of the HMD device 110. The HMD sensor 120 uses this function to detect the position and the inclination of the HMD device 110 in a real space.

In at least one aspect, the HMD sensor 120 may be achieved by a camera. In this case, the HMD sensor 120 may use image information of the HMD device 110 output from the camera to execute image analysis processing, to thereby enable detection of the position and the inclination of the HMD device 110.

In at least one aspect, the HMD device 110 may include the sensor 114 instead of the HMD sensor 120 as a position detector. The HMD device 110 may use the sensor 114 to detect the position and the inclination of the HMD device 110 itself. For example, when the sensor 114 is an angular velocity sensor, a geomagnetic sensor, an acceleration sensor, or a gyrosensor, the HMD device 110 may use any of those sensors instead of the HMD sensor 120 to detect the position and the inclination of the HMD device 110. As an example, when the sensor 114 is an angular velocity sensor, the angular velocity sensor detects over time the angular velocity about each of three axes of the HMD device 110 in the real space. The HMD device 110 calculates a temporal change of the angle about each of the three axes of the HMD device 110 based on each angular velocity, and further calculates an inclination of the HMD device 110 based on the temporal change of the angles.

In at least one aspect, the motion sensor 130 is mounted on the hand of the user to detect the movement of the hand of the user. For example, the motion sensor 130 detects a rotational speed and the number of rotations of the hand. The detection signal is transmitted to the computer 200. The motion sensor 130 is provided to, for example, the glove-type controller 160. According to at least one embodiment of this disclosure, to enhance safety in the real space, the controller 160 is mounted on an object that does not easily fly away, for example a glove-type object being worn on a hand of a user 190. In at least one aspect, a sensor that is not mounted on the user 190 may detect the movement of the hand of the user 190. For example, a signal of a camera that captures images of the user 190 may be input to the computer 200 as a signal representing the motion of the user 190. The motion sensor 130 and the computer 200 are connected to each other through wired or wireless communication. In the case of wireless communication, the communication mode is not particularly limited, and for example, Bluetooth® or other known communication methods may be used.

The eye gaze sensor 140 is configured to detect a direction (line-of-sight direction) in which the lines of sight of the right eye and the left eye of the user 190 are directed. The direction is detected by, for example, a known eye tracking function. The eye gaze sensor 140 is achieved by a sensor having the eye tracking function. In at least one aspect, the eye gaze sensor 140 includes a right-eye sensor and a left-eye sensor. The eye gaze sensor 140 may be, for example, a sensor configured to irradiate the right eye and the left eye of the user 190 with infrared light, and to receive reflection light from the cornea and the iris with respect to the irradiation light, to thereby detect a rotational angle of each eyeball. The eye gaze sensor 140 can detect the line-of-sight direction of the user 190 based on each detected rotational angle.

The server 150 may transmit instructions to the computer 200. In at least one aspect, the server 150 may communicate to/from another computer 200 for providing virtual reality to an HMD device used by another user. For example, when a plurality of users play a participatory game in an amusement facility, each computer 200 communicates to/from another computer 200 with a signal based on the motion of each user, to thereby enable the plurality of users to enjoy a common game in the same virtual space.

[Hardware Configuration]

Figure 2:
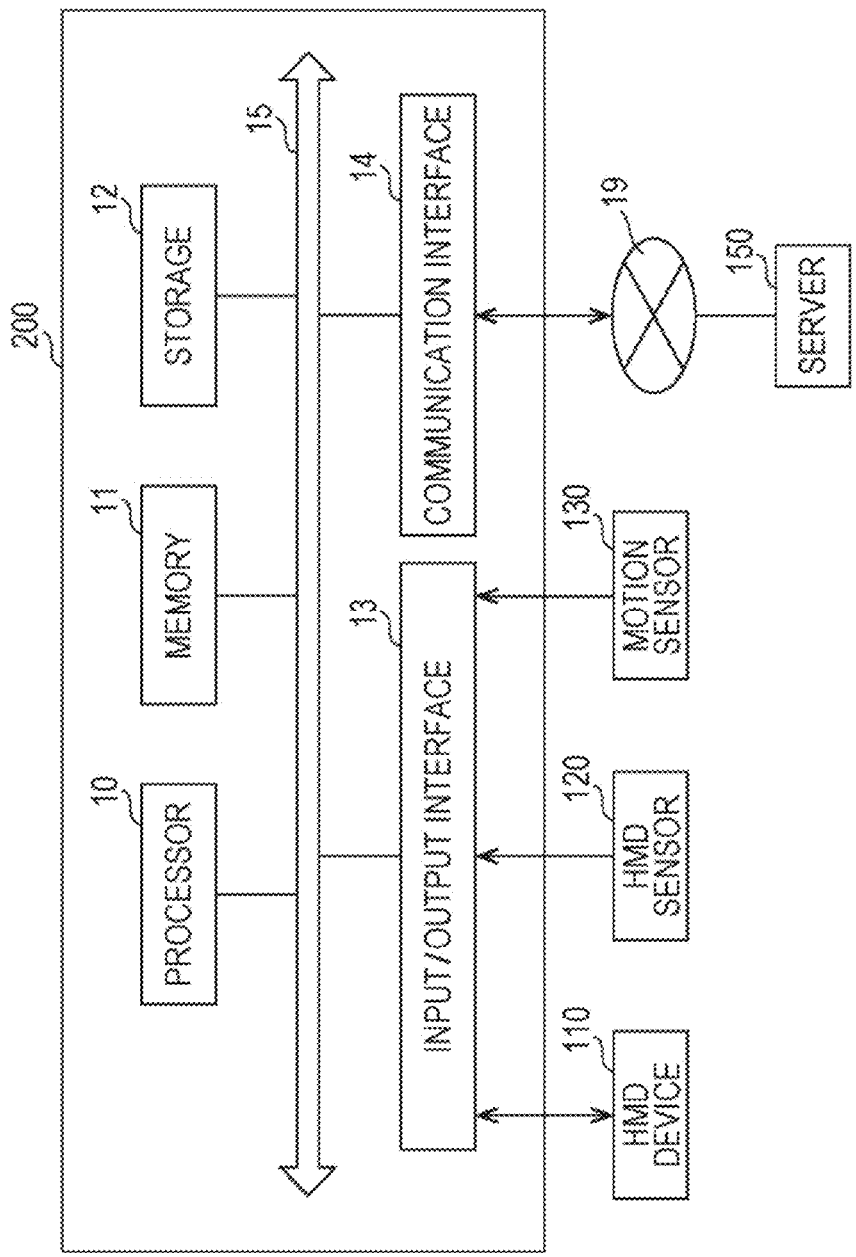
FIG. 2 A block diagram of a hardware configuration of a computer according to at least one embodiment of this disclosure.

With reference to FIG. 2, the computer 200 of at least one embodiment is described. FIG. 2 is a block diagram of the hardware configuration of the computer 200 in at least one embodiment of this disclosure. The computer 200 includes a processor 10, a memory 11, a storage 12, an input/output interface 13, and a communication interface 14. Each component is connected to a bus 15.

The processor 10 is configured to execute a series of commands included in a program stored in the memory 11 or the storage 12 based on a signal transmitted to the computer 200 or on satisfaction of a condition determined in advance. In at least one aspect, the processor 10 is achieved as a central processing unit (CPU), a micro-processor unit (MPU), a field-programmable gate array (FPGA), or other devices.

The memory 11 temporarily stores programs and data. Temporary storage of data is performed in a non-transitory manner, such that detection of the stored date is possible. The programs are loaded from, for example, the storage 12. The data includes data input to the computer 200 and data generated by the processor 10. In at least one aspect, the memory 11 is achieved as a random access memory (RAM) or other volatile memories.

The storage 12 permanently stores programs and data. The storage 12 is achieved as, for example, a read-only memory (ROM), a hard disk device, a flash memory, or other non-volatile storage devices. The programs stored in the storage 12 include programs for providing a virtual space in the HMD system 100, simulation programs, game programs, user authentication programs, and programs for achieving communication to/from other computers 200. The data stored in the storage 12 includes data and objects for defining the virtual space.

In at least one aspect, the storage 12 may be achieved as a removable storage device like a memory card. In at least one aspect, a configuration that uses programs and data stored in an external storage device may be used instead of the storage 12 built into the computer 200. With such a configuration, for example, in a situation where a plurality of HMD systems 100 are used as in an amusement facility, the programs and the data can be collectively updated.

The input/output interface 13 is configured to allow communication of signals among the HMD device 110, the HMD sensor 120, the motion sensor 130, and the server 150. In at least one aspect, the input/output interface 13 is achieved with use of a universal serial bus (USB) interface, a digital visual interface (DVI), a high-definition multimedia interface (HDMI)®, or other terminals. The input/output interface 13 is not limited to the examples described above.

The communication interface 14 is connected to the network 19 to communicate to/from other computers (for example, the server 150) connected to the network 19. In at least one aspect, the communication interface 14 is achieved as, for example, a local area network (LAN), other wired communication interfaces, wireless fidelity (WiFi), Bluetooth®, near field communication (NFC), or other wireless communication interfaces. The communication interface 14 is not limited to the examples described above.

In at least one aspect, the processor 10 loads one or more programs stored in the storage 12 to the memory 11 to execute a series of commands included in the program. The one or more programs may include an operating system of the computer 200, an application program for providing a virtual space, and game software that can be executed in the virtual space with use of the controller 160. The processor 10 transmits a signal for providing a virtual space to the HMD device 110 via the input/output interface 13. The HMD device 110 displays a video on the monitor 112 based on the signal.

In FIG. 2, the computer 200 is provided outside of the HMD device 110, but in at least one aspect, the computer 200 may be built into the HMD device 110. As an example, a portable information communication terminal (for example, a smartphone) including the monitor 112 may function as the computer 200.

Further, the computer 200 may be used in common among a plurality of HMD devices 110. With such a configuration, for example, the same virtual space can be provided to a plurality of users, and hence each user can enjoy the same application with other users in the same virtual space.

According to at least one embodiment of this disclosure, in the HMD system 100, a global coordinate system is set in advance. The global coordinate system has three reference directions (axes) that are respectively parallel to a vertical direction, a horizontal direction orthogonal to the vertical direction, and a front-rear direction orthogonal to both of the vertical direction and the horizontal direction in a real space. In at least one embodiment, the global coordinate system is one type of point-of-view coordinate system. Hence, the horizontal direction, the vertical direction (up-down direction), and the front-rear direction in the global coordinate system are defined as an x axis, a y axis, and a z axis, respectively. More specifically, the x axis of the global coordinate system is parallel to the horizontal direction of the real space, the y axis thereof is parallel to the vertical direction of the real space, and the z axis thereof is parallel to the front-rear direction of the real space.

In at least one aspect, the HMD sensor 120 includes an infrared sensor. When the infrared sensor detects the infrared ray emitted from each light source of the HMD device 110, the infrared sensor detects the presence of the HMD device 110. The HMD sensor 120 further detects the position and the inclination of the HMD device 110 in the real space in accordance with the movement of the user wearing the HMD device 110 based on the value of each point (each coordinate value in the global coordinate system). In more detail, the MID sensor 120 can detect the temporal change of the position and the inclination of the HMD device 110 with use of each value detected over time.

The global coordinate system is parallel to a coordinate system of the real space. Therefore, each inclination of the HMD device 110 detected by the HMD sensor 120 corresponds to each inclination about each of the three axes of the HMD device 110 in the global coordinate system. The HMD sensor 120 sets a UVW visual-field coordinate system to the MID device 110 based on the inclination of the HMD device 110 in the global coordinate system. The UVW visual-field coordinate system set to the HMD device 110 corresponds to a point-of-view coordinate system used when the user wearing the HMD device 110 views an object in the virtual space.

Overview of Configurations of Disclosed Embodiments (Configuration 1) According to at least one embodiment of this disclosure, there is provided a method of providing a virtual space 2 to the HMD device 110 by the computer 200. This method includes processing of defining the virtual space 2 by the processor 10 of the computer 200. The method further includes processing of determining, by the processor 10, a flying direction of an object that flies in the virtual space 2 in accordance with a motion of the user 190 of the HMD device 110, based on the motion of the user 190. The method further includes processing of causing, by the processor 10, the MID device 110 to display a field of view of the user 190 in the virtual space 2 so that the field of view is moved in the flying direction.

(Configuration 2) According to at least one embodiment of this disclosure, in addition to Configuration 1, the processing of determining a flying direction includes processing of determining a flying distance of the object in the virtual space 2 based on the motion of the user 190. The processing of causing the HMD device HO to display a field of view includes processing of causing the monitor 112 to display the field of view obtained from a position after movement in accordance with the flying distance in the virtual space 2.

(Configuration 3) According to at least one embodiment of this disclosure, in addition to Configuration 1 or 2, the method further includes processing of moving, by the processor 10, when the object reaches a target in the virtual space 2, the user 190 in the virtual space 2 to the target.

(Configuration 4) According to at least one embodiment of this disclosure, in addition to Configuration 3, the processing of moving the user 190 to the target include moving, when the object reaches a stationary object, the user 190 to the stationary object in the virtual space 2.

(Configuration 5) According to at least one embodiment of this disclosure, in addition to Configuration 3, the processing of moving the user 190 to the target include moving, when the object reaches a moving object, the user 190 in a traveling direction of the moving object.

(Configuration 6) According to at least one embodiment of this disclosure, in addition to any one of Configurations 3 to 5, the processing of moving the user 190 to the target include causing the HMD device 110 to display the field of view so that a landscape around the user 190 in the virtual space 2 approaches the user 190.

(Configuration 7) According to at least one embodiment of this disclosure, in addition to Configuration 1 or 2, the method further include processing of causing, by the processor 10, when the object reaches a target in the virtual space 2, the HMD device 110 to display the field of view of the user 190 so that the target is attracted toward the user 190.

(Configuration 8) According to at least one embodiment of this disclosure, in addition to any one of Configurations 1 to 7, the processing of determining a flying direction of an object include determining the flying direction of the object based on a physical quantity corresponding to a movement of a hand of the user 190 or on an operation performed on a controller connected to the computer 200.

(Configuration 9) According to at least one embodiment of this disclosure, in addition to any one of Configurations 1 to 8, the processing of determining a flying distance of an object include determining the flying distance of the object based on a physical quantity corresponding to a movement of a hand of the user 190 or on an operation performed on a controller connected to the computer 200.

(Configuration 10) The HMD system 100 according to at least one embodiment of this disclosure includes the HMD device 110 and the computer 200 configured to provide the virtual space 2 to the HMD device 110. The computer 200 includes the memory configured to store a series of commands and the processor 10 configured to execute the series of commands. The processor 10 is configured to, when the processor 10 executes the series of commands, define the virtual space 2. The processor 10 is further configured to, when the processor 10 executes the series of commands, determine the flying direction of the object that flies in the virtual space 2 in accordance with the motion of the user 190 of the HMD device 110, based on the motion of the user 190. The processor 10 is further configured to, when the processor 10 executes the series of commands, cause the HMD device 110 to display the field of view of the user 190 in the virtual space 2 so that the field of view is moved in the flying direction.

[UVW Visual-Field Coordinate System]

Figure 3:
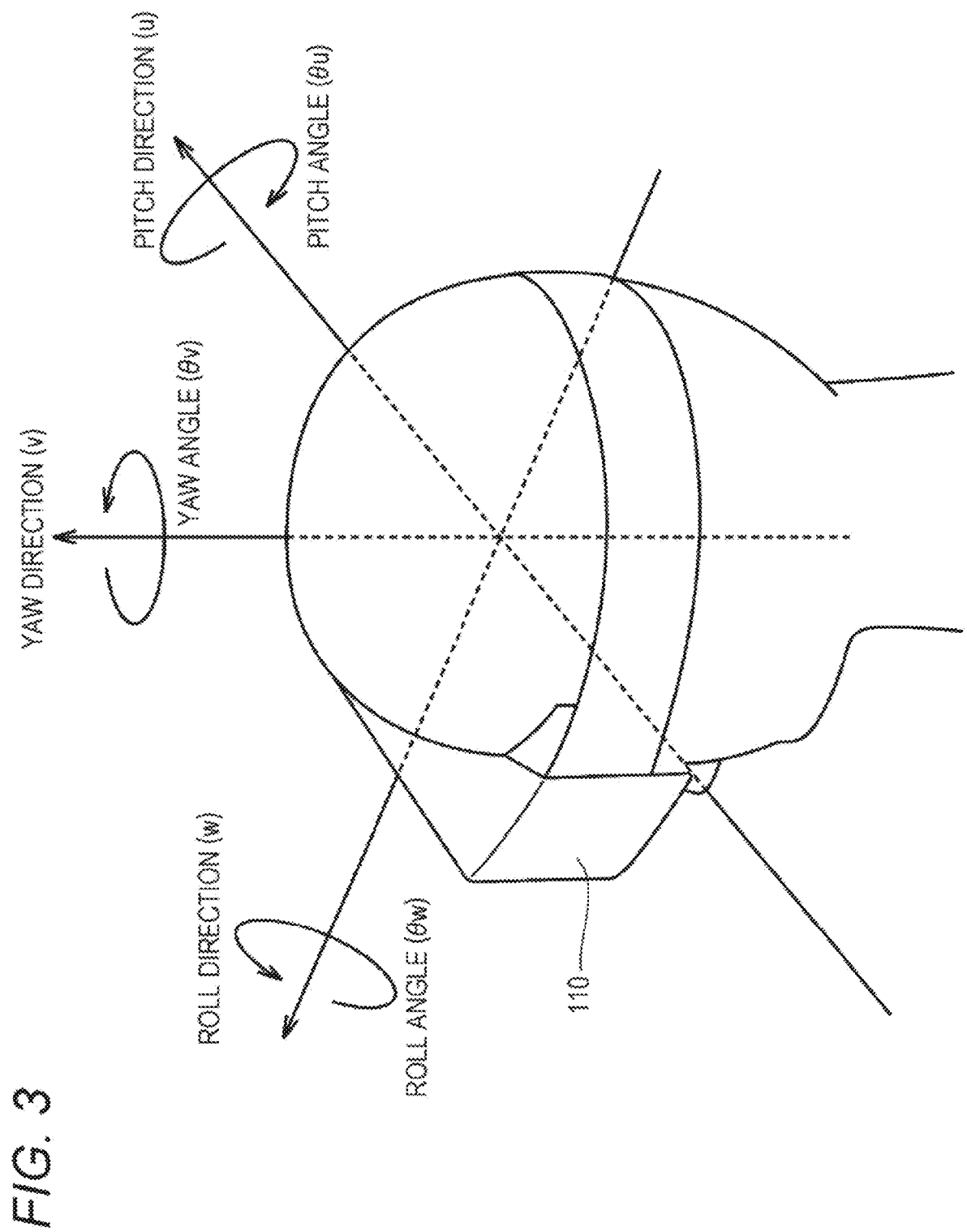
FIG. 3 A schematic diagram of a UVW visual-field coordinate system to be set for an HMD device of at least one embodiment of this disclosure.

With reference to FIG. 3, the UVW visual-field coordinate system is described. FIG. 3 is a schematic diagram of a UVW visual-field coordinate system to be set for the HMD device 110 of at least one embodiment of this disclosure. The HMD sensor 120 detects the position and the inclination of the HMD device 110 in the global coordinate system when the HMD device 110 is activated. The processor 10 sets the UVW visual-field coordinate system to the HMD device 110 based on the detected values.

In FIG. 3, the HMD device 110 sets a three-dimensional UVW visual-field coordinate system defining the head of the user wearing the HMD device 110 as a center (origin). More specifically, the HMD device 110 sets three directions newly obtained by inclining the horizontal direction, the vertical direction, and the front-rear direction (x axis, y axis, and z axis), which define the global coordinate system, about the respective axes by the inclinations about the respective axes of the HMD device 110 in the global coordinate system as a pitch direction (u axis), a yaw direction (v axis), and a roll direction (w axis) of the UVW visual-field coordinate system in the HMD device 110.

In at least one aspect, when the user 190 wearing the HMD device 110 is standing upright and is visually recognizing the front side, the processor 10 sets the UVW visual field coordinate system that is parallel to the global coordinate system to the HMD device 110. In this case, the horizontal direction (x axis), the vertical direction (y axis), and the front-rear direction (z axis) of the global coordinate system directly match with the pitch direction (u axis), the yaw direction (v axis), and the roll direction (w axis) of the UVW visual-field coordinate system in the HMD device 110.

After the UVW visual-field coordinate system is set to the HMD device 110, the HMD sensor 120 can detect the inclination (change amount of the inclination) of the HMD device 110 in the UVW visual-field coordinate system that is set based on the movement of the HMD device 110. In this case, the HMD sensor 120 detects, as the inclination of the HMD device 110, each of a pitch angle. (θu), a yaw angle (θv), and a roll angle (θw) of the HMD device 110 in the UVW visual-field coordinate system. The pitch angle (θu) represents an inclination angle of the HMD device 110 about the pitch direction in the UVW visual-field coordinate system. The yaw angle (θv) represents an inclination angle of the HMD device 110 about the yaw direction in the UVW visual-field coordinate system. The roll angle (θw) represents an inclination angle of the HMD device 110 about the roll direction in the UVW visual-field coordinate system.

The HMD sensor 120 sets, to the HMD device 110, the UVW visual field coordinate system of the HMD device 110 obtained after the movement of the HMD device 110 based on the detected inclination angle of the HMD device 110. The relationship between the HMD device 110 and the UVW visual-field coordinate system of the HMD device 110 is constant regardless of the position and the inclination of the HMD device 110. When the position and the inclination of the HMD device 110 change, the position and the inclination of the UVW visual-field coordinate system of the HMD device 110 in the global coordinate system change in synchronization with the change of the position and the inclination.

In at least one aspect, the HMD sensor 120 may specify the position of the HMD device 110 in the real space as a position relative to the HMD sensor 120 based on the light intensity of the infrared ray or a relative positional relationship between a plurality of detection points (for example, a distance between the detection points), which is acquired based on output from the infrared sensor. Further, the processor 10 may determine the origin of the UVW visual-field coordinate system of the HMD device 110 in the real space (global coordinate system) based on the specified relative position.

[Virtual Space]

Figure 4:
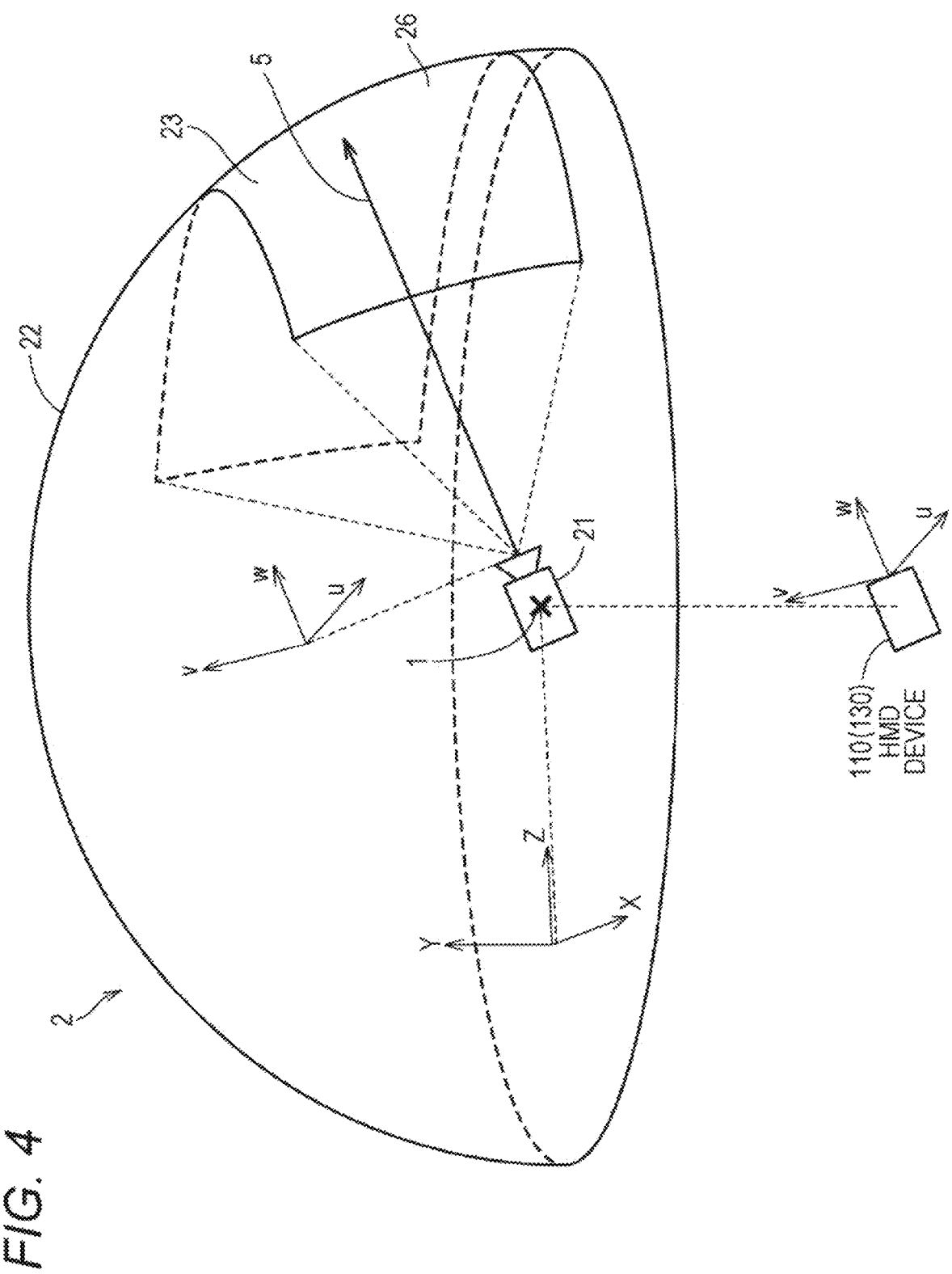
FIG. 4 A schematic diagram of a mode of expressing a virtual space of at least one embodiment of this disclosure.

With reference to FIG. 4, the virtual space is further described. FIG. 4 is a diagram of a mode of expressing the virtual space of at least one embodiment of this disclosure. The virtual space 2 has a structure with an entire celestial sphere shape covering a center 21 in all 360-degree directions. In FIG. 4, for the sake of simplicity, only the upper-half celestial sphere of the virtual space 2 is exemplified although one of ordinary skill would recognize that the virtual space 2 includes a lower-half celestial sphere as well. Each mesh section is defined in the virtual space 2. The position of each mesh section is defined in advance as coordinate values in an XYZ coordinate system defined in the virtual space 2. The computer 200 associates each partial image forming content (for example, still image or moving image) that can be developed in the virtual space 2 with each corresponding mesh section in the virtual space 2, to thereby provide, to the user, the virtual space 2 in which a virtual space image 22 that can be visually recognized by the user is developed.

In at least one aspect, in the virtual space 2, an XYZ spatial coordinate system having the center 21 as the origin is defined. The XYZ coordinate system is, for example, parallel to the global coordinate system. The XYZ coordinate system is one type of the point-of-view coordinate system, and hence the horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the global coordinate system, the Y axis (vertical direction) of the XYZ coordinate system is parallel to the y axis of the global coordinate system, and the Z axis (front-rear direction) of the XYZ coordinate system is parallel to the z axis of the global coordinate system.

When the HMD device 110 is activated, that is, when the HMD device 110 is initialized, a virtual camera 1 is arranged at the center 21 of the virtual space 2. In synchronization with the movement of the HMD device 110 in the real space, the virtual camera 1 similarly moves in the virtual space 2. With this, the change in position and direction of the HMD device 110 in the real space is reproduced similarly in the virtual space 2.

The UVW visual-field coordinate system is defined in the virtual camera 1 similarly to the HMD device 110. The Ii W visual field coordinate system of the virtual camera in the virtual space 2 is defined to be synchronized with the UVW visual-field coordinate system of the HMD device 110 in the real space (global coordinate system). Therefore, when the inclination of the HMD device 110 changes, the inclination of the virtual camera 1 also changes in synchronization therewith. The virtual camera 1 can also move in the virtual space 2 in synchronization with the movement of the user wearing the HMD device 110 in the real space.

The direction of the virtual camera 1 is determined based on the position and the inclination of the virtual camera 1, and hence a line of sight (reference line of sight 5) serving as a reference when the user visually recognizes the virtual space image 22 is determined based on the direction of the virtual camera 1. The processor 10 of the computer 200 defines a field-of-view region 23 in the virtual space 2 based on the reference line of sight 5. The field-of-view region 23 corresponds to a field of view of the user wearing the HMD device 110 in the virtual space 2.

The line-of-sight direction of the user 190 detected by the eye gaze sensor 140 is a direction in the point-of-view coordinate system obtained when the user 190 visually recognizes an object. The UVW visual-field coordinate system of the HMD device 110 is equal to the point-of-view coordinate system used when the user 190 visually recognizes the monitor 112. Further, the UVW visual-field coordinate system of the virtual camera 1 is synchronized with the UVW visual-field coordinate system of the HMD device 110. Therefore, in the HMD system 100 in at least one aspect, the line-of-sight direction of the user 190 detected by the eye gaze sensor 140 can be regarded as the user's line-of-sight direction in the UVW visual-field coordinate system of the virtual camera 1.

[User Line-of-Sight]

Figure 5:
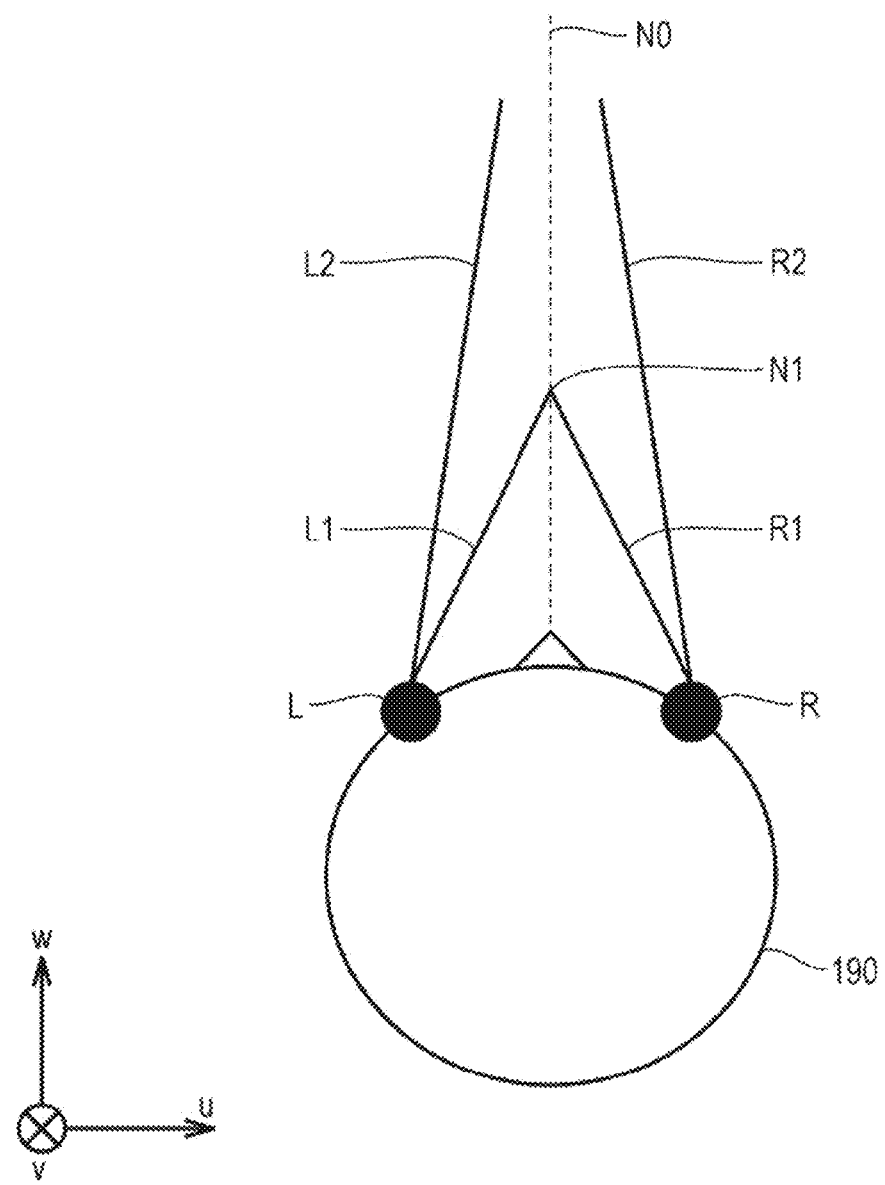
FIG. 5 A diagram of a head of a user wearing an HMD device of at least one embodiment of this disclosure.

With reference to FIG. 5, determination of the user's line-of-sight direction is described. FIG. 5 is a diagram of the head of the user wearing the HMD device of at least one embodiment of this disclosure.

In at least one aspect, the eye gaze sensor 140 detects lines of sight of the right eye and the left eye of the user 190. In at least one aspect, when the user 190 is looking at a near place, the eye gaze sensor 140 detects lines of sight R1 and L1. In at least one aspect, when the user 190 is looking at a far place, the eye gaze sensor 140 detects lines of sight R2 and L2. In this case, the angles formed by the lines of sight R2 and L2 with respect to the roll direction w are smaller than the angles formed by the lines of sight R1 and L1 with respect to the roll direction w. The eye gaze sensor 140 transmits the detection results to the computer 200.

When the computer 200 receives the detection values of the lines of sight R1 and L1 from the eye gaze sensor 140 as the detection results of the lines of sight, the computer 200 specifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 specifies an intersection of both the lines of sight R2 and L2 as the point of gaze. The computer 200 identifies a line-of-sight direction NO of the user 190 based on the specified point of gaze N1. The computer 200 detects, for example, an extension direction of a straight line that passes through the point of gaze N1 and a midpoint of a straight line connecting a right eye R and a left eye L of the user 190 to each other as the line-of-sight direction N0. The line-of-sight direction NO is a direction in which the user 190 actually directs his or her lines of sight with both eyes. Further, the line-of-sight direction NO corresponds to a direction in which the user 190 actually directs his or her lines of sight with respect to the field-of-view region 23.

In at least one aspect, the HMD system 100 may include microphones and speakers in any part constructing the HMD system 100. When the user speaks to the microphone, an instruction can be given to the virtual space 2 with voice.

Further, in at least one aspect, the HMD system 100 may include a television broadcast reception tuner. With such a configuration, the HMD system 100 can display a television program in the virtual space 2.

In at least one aspect, the HMD system 100 may include a communication circuit for connecting to the Internet or have a verbal communication function for connecting to a telephone line.

[Field-of-View Region]

Figure 6:
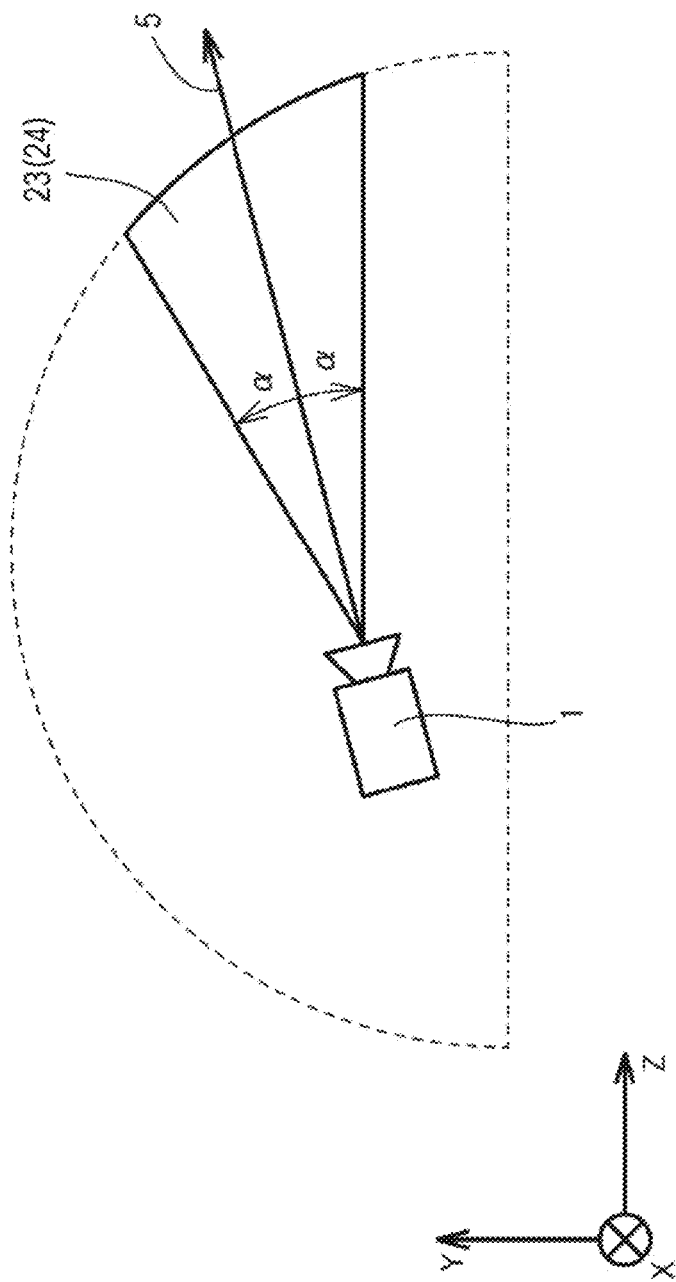
FIG. 6 A cross-sectional diagram of a YZ cross section obtained by viewing a field-of-view region from an X direction in the virtual space according to at least one embodiment of this disclosure.
Figure 7:
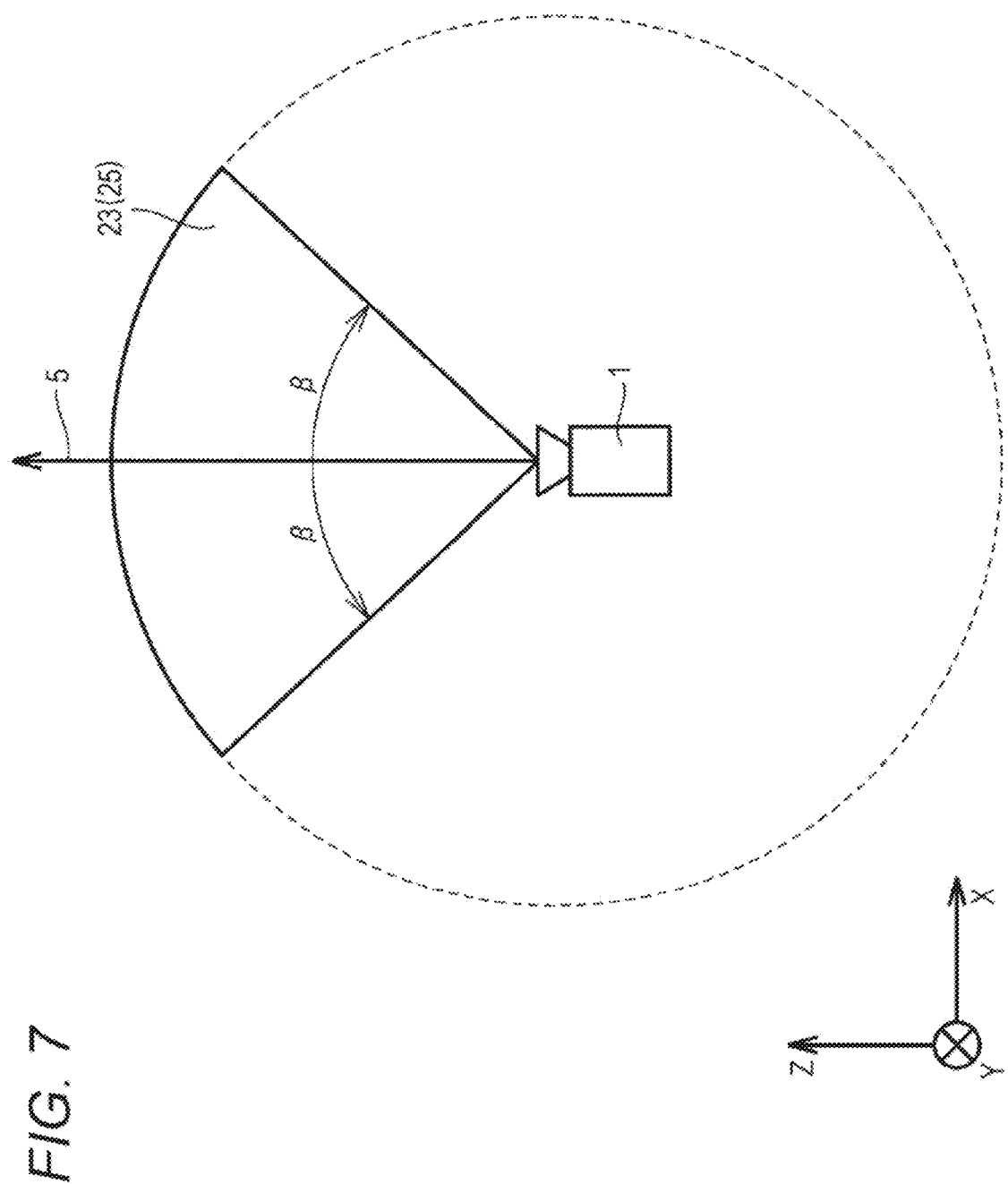
FIG. 7 A cross-sectional diagram of an XZ cross section obtained by viewing the field-of-view region from a Y direction in the virtual space according to at least one embodiment of this disclosure.

With reference to FIG. 6 and FIG. 7, the field-of-view region 23 is described. FIG. 6 is a cross-sectional diagram of a YZ cross section obtained by viewing the field-of-view region 23 from an X direction in the virtual space 2 according to at least one embodiment of this disclosure. FIG. 7 is a cross-sectional diagram of an XZ cross section obtained by viewing the field-of-view region 23 from a Y direction in the virtual space 2 according to at least one embodiment of this disclosure.

In FIG. 6, the field-of-view region 23 in the YZ cross section includes a region 24. The region 24 is defined by the reference line of sight 5 of the virtual camera 1 and the YZ cross section of the virtual space 2. The processor 10 defines a range of a polar angle α or more from the reference line of sight 5 serving as the center in the virtual space as the region 24.

In FIG. 7, the field-of-view region 23 in the XZ cross section includes a region 25. The region 25 is defined by the reference line of sight 5 and the XZ cross section of the virtual space 2. The processor 10 defines a range of a polar angle β or more from the reference line of sight 5 serving as the center in the virtual space 2 as the region 25.

In at least one aspect, the HMD system 100 causes the monitor 112 to display a field-of-view image 26 based on the signal from the computer 200, to thereby provide the virtual space to the user 190. The field-of-view image 26 corresponds to a part of the virtual space image 22, which is superimposed on the field-of-view region 23. When the user 190 moves the HMD device 110 worn on his or her head, the virtual camera 1 is also moved in synchronization with the movement. As a result, the position of the field-of-view region 23 in the virtual space 2 is changed. With this, the field-of-view image 26 displayed on the monitor 112 is updated to an image that is superimposed on the field-of-view region 23 of the virtual space image 22 in a direction in which the user faces in the virtual space 2. The user can visually recognize a desired direction in the virtual space 2.

In at least one embodiment, while the user 190 is wearing the HMD device 110, the user 190 cannot visually recognize the real world but can visually recognize only the virtual space image 22 developed in the virtual space 2. Therefore, the MID system 100 can provide a high sense of immersion in the virtual space 2 to the user.

In at least one aspect, the processor 10 may move the virtual camera 1 in the virtual space 2 in synchronization with the movement in the real space of the user 190 wearing the HMD device 110. In this case, the processor 10 specifies an image region to be projected on the monitor 112 of the HMD device 110 (that is, the field-of-view region 23 in the virtual space 2) based on the position and the direction of the virtual camera 1 in the virtual space 2.

According to at least one embodiment of this disclosure, the virtual camera 1 is desired to include two virtual cameras, that is, a virtual camera for providing a right-eye image and a virtual camera for providing a left-eye image. Further, in at least one embodiment, an appropriate parallax be set for the two virtual cameras so that the user 190 can recognize the three-dimensional virtual space 2. In at least one embodiment, a technical idea of this disclosure is exemplified assuming that the virtual camera 1 includes two virtual cameras, and the roll directions of the two virtual cameras are synthesized so that the generated roll direction (w) is adapted to the roll direction (w) of the HMD device 110.

[Control Device of HMD Device]

Figure 8:
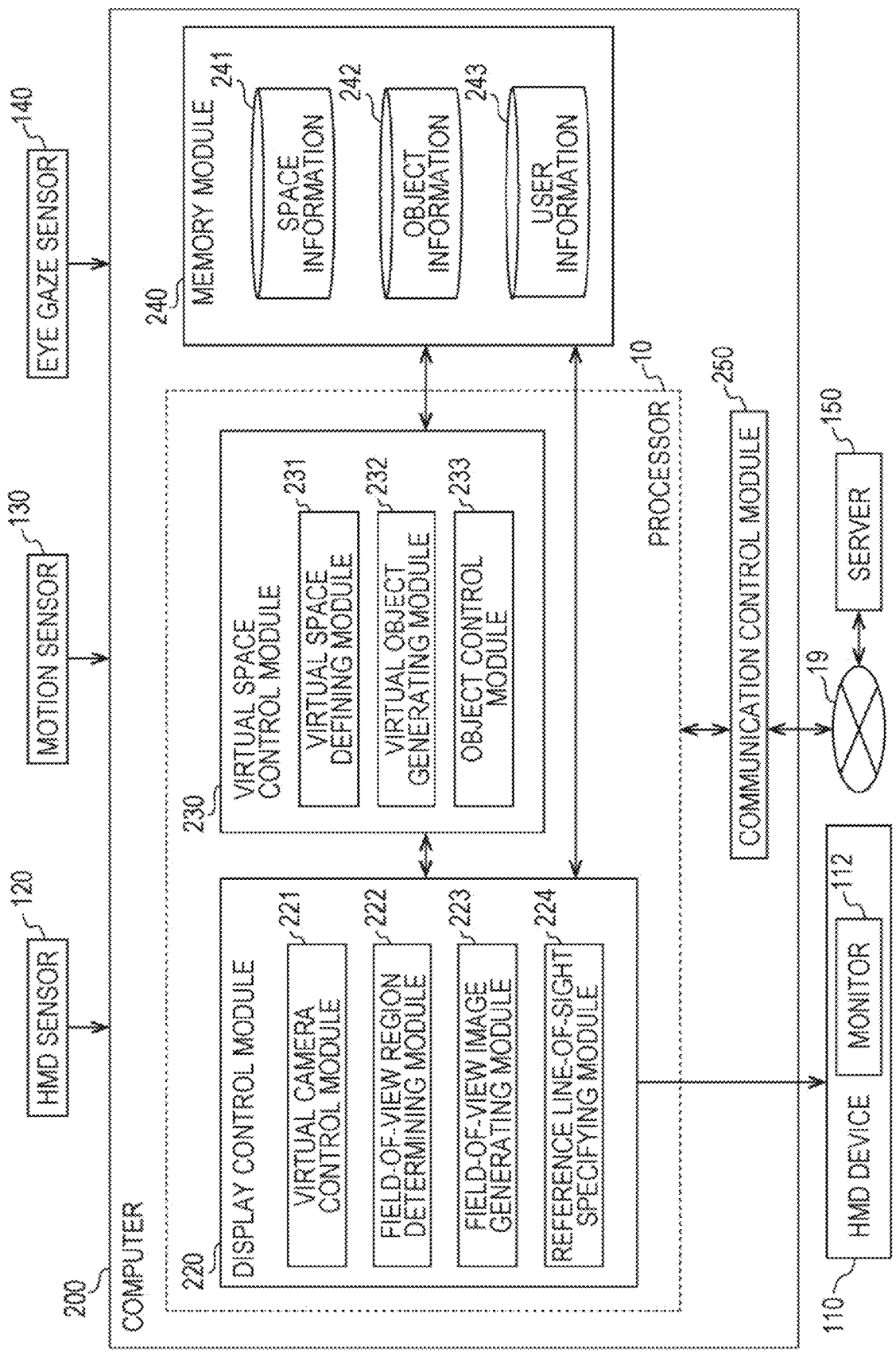
FIG. 8 A block diagram of a functional configuration to be achieved by the computer of at least one embodiment of this disclosure.

With reference to FIG. 8, the control device of the HMD device 110 is described. According to at least one embodiment of this disclosure, the control device is achieved by the computer 200 having a known configuration. FIG. 8 is a block diagram of the computer 200 of at least one embodiment of this disclosure as a module configuration.

In FIG. 8, the computer 200 includes a display control module 220, a virtual space control module 230, a memory module 240, and a communication control module 250. The display control module 220 includes, as sub-modules, a virtual camera control module 221, a field-of-view region determining module 222, a field-of-view image generating module 223, and a reference line-of-sight specifying module 224. The virtual space control module 230 includes, as sub-modules, a virtual space defining module 231, a virtual object generating module 232, and an object control module 233. The memory module 240 stores space information 241, object information 242, and user information 243.

According to at least one embodiment of this disclosure, the display control module 220 and the virtual space control module 230 are achieved by the processor 10. According to at least one embodiment of this disclosure, a plurality of processors 10 may be combined to function as the display control module 220 and the virtual space control module 230. The memory module 240 includes the memory 11 or the storage 12. The communication control module 250 includes the communication interface 14.

In at least one aspect, the display control module 220 is configured to control the image display on the monitor 112 of the HMD device 110. The virtual camera control module 221 is configured to arrange the virtual camera 1 in the virtual space 2, and control the behavior, the direction, and the like of the virtual camera 1. The field-of-view region determining module 222 is configured to define the field-of-view region 23. The field-of-view image generating module 223 is configured to generate the field-of-view image 26 to be displayed on the monitor 112 based on the determined field-of-view region 23.

The reference line-of-sight specifying module 224 is configured to specify the line of sight of the user 190 based on the signal from the eye gaze sensor 140.

The virtual space control module 230 is configured to control the virtual space 2 to be provided to the user 190. The virtual space defining module 231 is configured to generate virtual space data representing the virtual space 2 to define the virtual space 2 in the HMD system 100.

The virtual object generating module 232 is configured to generate a target to be displayed in the virtual space 2. Examples of the target include forests, mountains, other landscapes, and animals to be displayed in accordance with the progression of the story of the game.

The object control module 233 is configured to control the motion of the object held by the user in the virtual space 2. Examples of the object may include ropes, stones, lassos, and other throwing objects to be thrown in the virtual space 2 in synchronization with the motion of the user 190 in the real space.

The memory module 240 stores data to be used for providing the virtual space 2 to the user 190 by the computer 200. In at least one aspect, the memory module 240 stores the space information 241, the object information 242, and the user information 243. The space information 241 stores one or more templates defined for providing the virtual space 2. The object information 242 stores content to be played in the virtual space 2, and information for displaying an object to be used in the content. Examples of the content may include a game and content representing a landscape similar to that of the real society. The user information 243 stores a program for causing the computer 200 to function as the control device of the HMD system 100, an application program that uses each piece of content stored in the object information 242, and the like. The data and programs stored in the memory module 240 are input by the user of the HMD device 110. Alternatively, the computer 200 downloads the data and programs from a computer (for example, the server 150) that is managed by an external operator providing the content, to thereby store the data and programs in the memory module 240.

The communication control module 250 may communicate to/from the server 150 or other information communication devices via the network 19.

In at least one aspect, the display control module 220 and the virtual space control module 230 may be achieved with use of Unity® provided by Unity Technologies.

[Control Structure]

Figure 9:
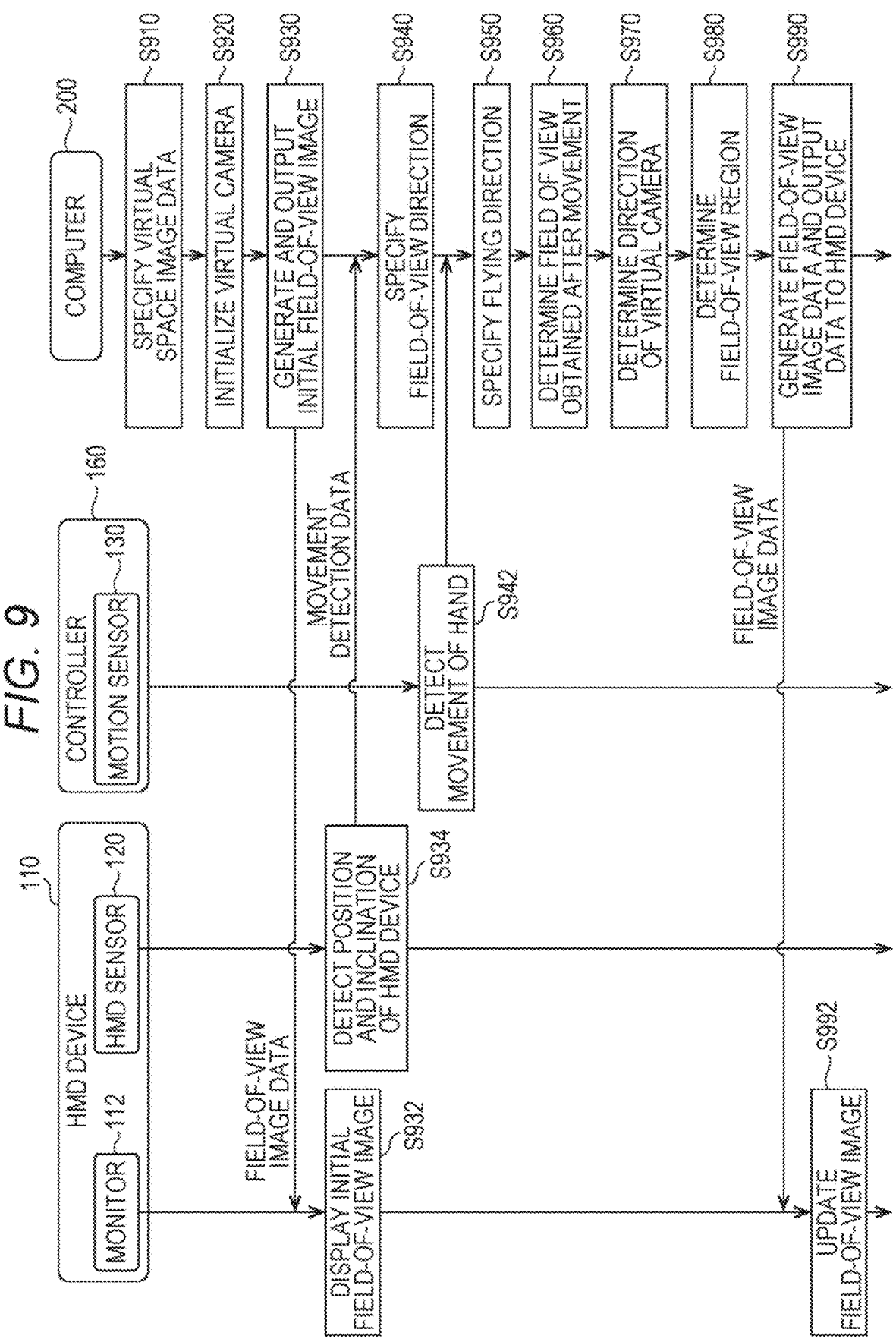
FIG. 9 A flowchart of processing to be executed by the HMD system according to at least one embodiment of this disclosure.

With reference to FIG. 9, the control structure of the HMD system 100 is described. FIG. 9 is a flow chart of processing to be executed by the HMD system 100 according to at least one embodiment of this disclosure.

In Step S910, the processor 10 of the computer 200 serves as the virtual space defining module 231 to specify the virtual space image data.

In Step S920, the processor 10 initializes the virtual camera 1. For example, the processor 10 arranges the virtual camera 1 at the center point defined in advance in the virtual space 2, and directs the line of sight of the virtual camera 1 to a direction in which the user 190 faces.

In Step S930, the processor 10 serves as the field-of-view image generating module 223 to generate an initial field-of-view image. The generated field-of-view image is transmitted to the HMD device 110 by the communication control module 250 via the field-of-view image generating module 223.

In Step S932, the monitor 112 of the HMD device 110 displays the field-of-view image based on the signal received from the computer 200. The user 190 wearing the HMD device 110 may recognize the virtual space 2 through visual recognition of the field-of-view image.

In Step S934, the HMD sensor 120 detects the position and the inclination of the HMD device 110 based on a plurality of infrared beams emitted from the HMD device 110. The detection result is transmitted to the computer 200 as movement detection data.

In Step S940, the processor 10 specifies the field-of-view direction of the user 190 wearing the HMD device 110 based on the position and the inclination of the HMD device 110. The processor 10 executes an application program to display an object in the virtual space 2 based on the command included in the application program. The user 190 enjoys the content that can be visually recognized in the virtual space 2 through execution of the application program. In at least one aspect, examples of the content include ball games, lassos, other playgames, and guided tours in sightseeing spots.

In Step S942, the motion sensor 130 detects the movement of the hand of the user 190. The signal representing the detected movement is transmitted to the computer 200. The signal includes a rotational speed and an acceleration of the hand. For example, in at least one aspect, when an application program of a ball game is executed, there may be a scene in which a virtual user present in the virtual space 2 throws a ball in accordance with the swing of the arm of the user 190. In this case, when the user 190 actually moves his or her arm, the rotational direction and the speed of the arm are detected. In at least one aspect, when a game of throwing a rope is executed and the user 190 rotates his or her arm, the rotational speed of the arm while the rope is rotated and the direction in which the arm is swung when the rope is thrown are detected. In at least one aspect, when a trip application program is executed, the virtual user in the virtual space 2 may function as a sightseeing guide. In this case, the movement of the right arm and the direction indicated by the right arm when the sightseeing guide in the virtual space 2 says "please look on the right side" to the tourist are detected.

In Step S950, the processor 10 specifies a flying direction based on the signal output from the motion sensor 130. In at least one embodiment, the flying direction includes a direction in which balls, rings, stones, or other virtual objects fly in the virtual space 2, or a direction indicated by an arm, a finger, a pointer, or other objects of the virtual user.

In Step S960, the processor 10 determines the field of view obtained after the movement of the virtual user based on the specified flying direction.

In Step S970, the processor 10 determines the direction of the virtual camera 1 based on the specified flying direction.

In Step S980, the processor 10 determines the field-of-view region based on the determined direction of the virtual camera 1. In this embodiment, the field-of-view region represents a range that the virtual can visually recognize in the virtual space 2.

In Step S990, the computer 200 generates the field-of-view image data for displaying the field-of-view image in accordance with the determined field-of-view region, and outputs the generated field-of-view image data to the MID device 110.

In Step S992, the monitor 112 of the HMD device 110 updates the field-of-view image based on the received field-of-view image data, and displays the updated field-of-view image. The user 190 can recognize the updated field-of-view image, that is, the field of view obtained after the line of sight has been moved in the flying direction. While the above description refers to processor 10, one of ordinary skill in the art would recognize that the functions of processor 10 could be separated among a plurality of processors.

Figure 10:
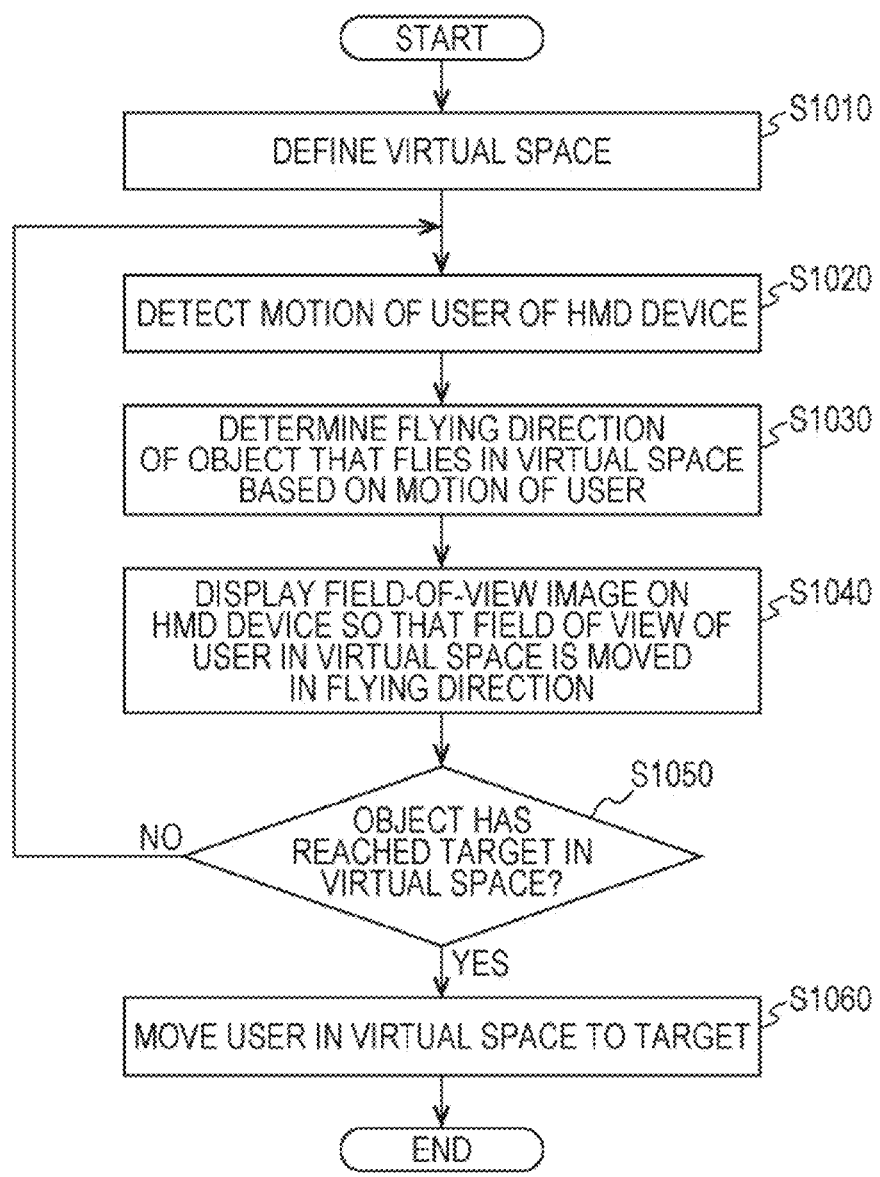
FIG. 10 A flow chart of processing to be executed by the computer when a virtual user throws a lasso or other objects to a target in the virtual space according to at least one embodiment of this disclosure.

With reference to FIG. 10, the control structure of the computer 200 is further described. FIG. 10 is a flow chart of processing to be executed by the computer 200 when the virtual user throws a lasso or other objects to a target in the virtual space 2 according to at least one embodiment of this disclosure.

In Step S1010, the processor 10 serves as the virtual space defining module 231 to define the virtual space 2 in the memory 11.

In Step S1020, the processor 10 detects the motion of the user 190 wearing the HMD device 110 based on the signal from the motion sensor 130.

In Step S1030, the processor 10 determines the flying direction of the object that flies in the virtual space 2 based on the motion of the user 190. For example, the processor 10 determines parameters such as an initial speed and the flying direction when the object flies based on the rotational speed and the throwing direction of the right hand of the user 190. In at least one aspect, the processor 10 may determine the parameters based on the number of rotations and the throwing direction of the right hand of the user 190. When the number of rotations is taken into consideration, as compared to the case where the rotational speed is taken into consideration, controller 160 can more easily perform control so that the object flies before the controller 160 separates from the hand of the user 190, and hence the HMD device 110 can be used more safely.

In Step S1040, the processor 10 serves as the virtual object generating module 232 to generate the field-of-view image data for displaying the field-of-view image on the HMD device 110 so that the field of view of the user 190 in the virtual space 2 is moved in the flying direction. The processor 10 transmits the generated field-of-view image data to the HMD device 110 to cause the monitor 112 to display the field-of-view image based on the field-of-view image data.

In Step S1050, the processor 10 determines whether or not the object has reached the target of the virtual space 2 based on a virtual distance between the virtual user and the target in the virtual space and on the rotational motion of the arm of the user 190. For example, the target may be a tree, a rock, or other stationary objects displayed in the virtual space 2, or may be moving objects that run in the virtual space 2 such as an automobile, a dog, or a horse. Whether or not the object has reached the target may be determined based on, for example, the initial speed and the flying direction of the object in the virtual space 2 and the virtual distance from the virtual user to the target. This determination is applied in the virtual space 2, and hence the air resistance or other physical quantities that need to be considered in the real space may be ignored. When the processor 10 determines that the object has reached the target of the virtual space 2 (YES in Step S1050), the control is switched to Step S1060. Otherwise (NO in Step S1050), the processor 10 returns the control to Step S1020.

In Step S1060, the processor 10 serves as the object control module 233 to move the position of the virtual user in the virtual space 2 to the target.

In at least one aspect, in the determination of Step S1050, for example, physical calculation to be executed in game software may be taken into consideration. In this case, for example, the size and the mass of the object, the gravity or the air resistance in the virtual space 2, and the like may be taken into consideration. In this manner, a more enjoyable experience may be given in the virtual reality.

In at least one aspect, instead of the determination processing in Step S1050, the processor 10 may execute processing of specifying a target that the object has reached. Examples of the target include a tree, a rock, a ground, other stationary objects, an animal, a vehicle, and other moving objects. In at least one aspect, for example, the processor 10 may generate the field-of-view image so that the virtual user is moved to the target at high speed in the virtual space 2. In this manner, even in a situation of high-speed movement, which is a unique situation in the virtual reality, the VR sickness can be reduced or prevented from occurring to the user 190. While the above description refers to processor 10, one of ordinary skill in the art would recognize that the functions of processor 10 could be separated among a plurality of processors.

[Movement of User with Respect to Stationary Object]

With reference to FIG. 11 to FIG. 13, description is given of the movement of the user with respect to the stationary object in the virtual space 2. According to at least one embodiment of this disclosure, a tree is exemplified as the stationary object, but the stationary object is not limited to the exemplified object. The stationary object may be at least an object that can be visually recognized by the user in the virtual space 2, for example, a building or the other shore of a river.

Figure 11A:
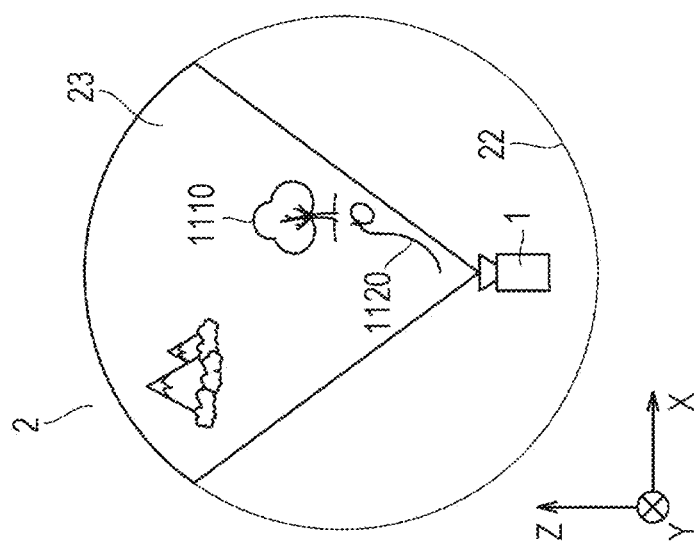
FIG. 11A A diagram of a state in which a mountain and a tree are present in the virtual space according to at least one embodiment of this disclosure.
Figure 11B:
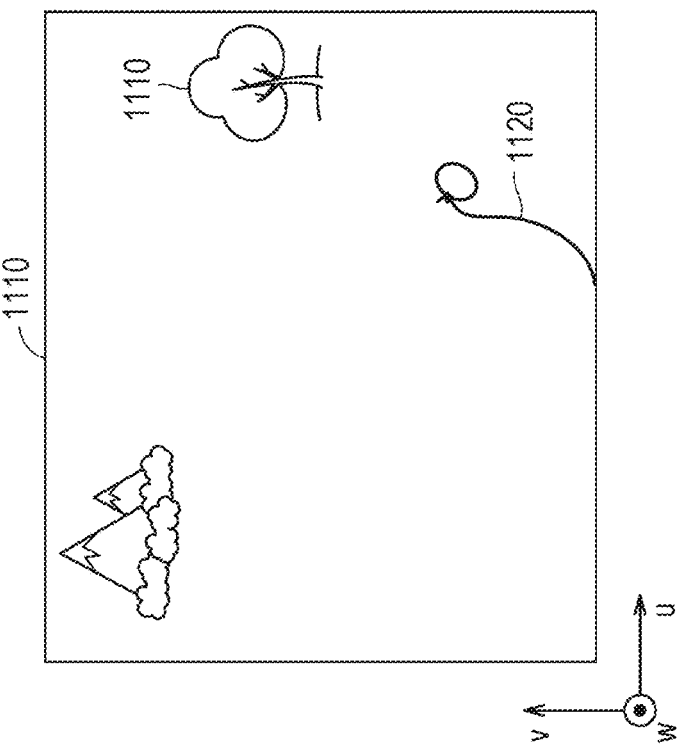
FIG. 11B A diagram of a state in which a mountain and a tree are present virtual space according to at least one embodiment of this disclosure.

FIGS. 11A and 11B are diagrams of a state in which a mountain and a tree are present in the virtual space 2 according to at least one embodiment of this disclosure. The user recognizes a tree on the front right side and recognizes a mountain of the front left side. FIG. 11A is an image 1100 that is visually recognized in the virtual space 2 by the user 190 wearing the HMD device 110. FIG. 11B is a diagram of a state in which the virtual space 2 is viewed from above (Y direction).

As an example, description is given on a scenario in which the HMD system 100 causes the virtual user to throw a rope in the virtual space 2 so that the virtual user is moved to a position at which the rope is caught. In at least one aspect, the user 190 wearing the HMD device 110 mounts a sensor on his or her right hand. The sensor detects the movement (rotation or throwing motion) of the right hand, and the detection result is input to the computer 200. The computer 200 executes an application program for implementing the scenario, and transmits a signal for displaying the image to the monitor 112. When the monitor 112 displays the image in accordance with the signal, the user 190 recognizes the image.

In FIG. 11A, in at least one aspect, the virtual user in the virtual space 2 visually recognizes a mountain and a tree 1110. When the user 190 moves his or her hand on which the controller 160 is mounted in accordance with the progression of the above-mentioned scenario to perform a motion defined in advance in order to display a rope, a rope 1120 is displayed.

In FIG. 11B, when the virtual space 2 is viewed from the Y-axis direction, the rope 1120 is displayed in the visual field of the virtual camera 1 corresponding to the virtual user.

FIGS. 12A and 12B are diagrams of a state when the virtual user throws the rope 1120 toward the tree 1110 according to at least one embodiment of this disclosure. FIG. 12A is a diagram of a state in which the rope 1120 flies toward the tree 1110. FIG. 12B is a diagram of a state in which the virtual camera 1 is directed toward the tree 1110 in accordance with the thrown rope 1120.

When the user 190 rotates his or her right arm several times and then swings his or her right hand to the front right side, the processor 10 switches the image to be displayed on the monitor 112 based on the signal output from the sensor mounted to the right hand. More specifically, the field-of-view image in the virtual space 2 is switched to an image having the tree 1110 at the center. When the virtual user throws the rope 1120, the virtual user may visually recognize the field-of-view image as if the line of sight is switched in the direction of the tree 1110. The user 190 can predict the direction in which the rope 1120 flies, and hence a so-called visually induced motion sickness (VR sickness) can be reduced or prevented without reducing the user's sense of immersion.

Figure 13B:
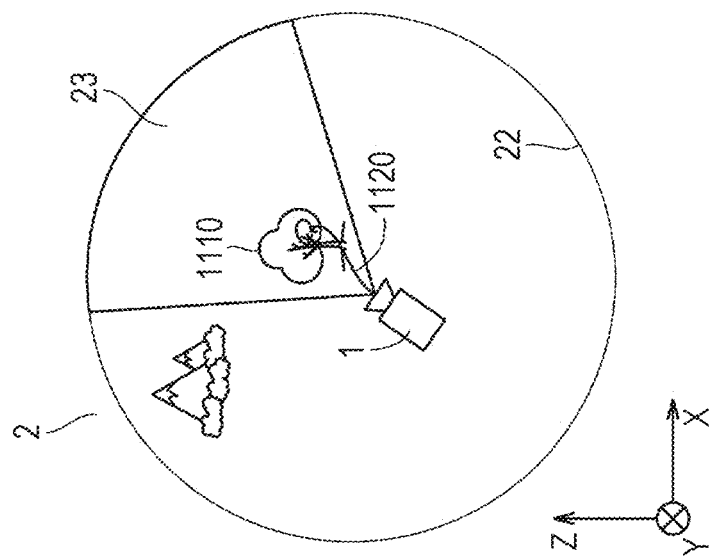
FIG. 13B A diagram of the virtual user having moved to the vicinity of the tree in response to a loop of the rope being caught on the tree according to at least one embodiment of this disclosure.
Figure 13A:
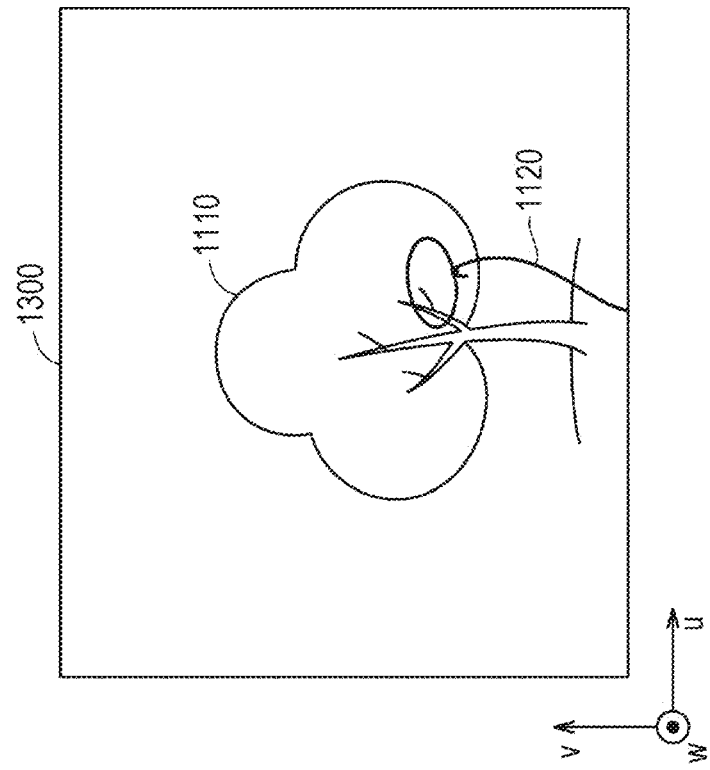
FIG. 13A A diagram of the virtual user having moved to the vicinity of the tree in response to a loop of the rope being caught on the tree according to at least one embodiment of this disclosure.

FIGS. 13A and 13B are diagrams of the virtual user having moved to the vicinity of the tree 1110 in response to a loop of the rope 1120 being caught on the tree 1110 according to at least one embodiment of this disclosure. FIG. 13A is a diagram of an image that is visually recognized by the virtual user that has moved to the vicinity of the tree 1110. FIG. 13B is a diagram of the position and the direction of the virtual camera 1 in the virtual space 2.

In FIG. 13A, in at least one aspect, an image 1300 displays a state in which the virtual user has moved to the vicinity of the tree 1110. When the user 190 performs such a motion of pulling the rope 1120 to himself or herself after the rope 1120 thrown by the virtual user present in the virtual space 2 is caught to a branch of the tree 1110, the virtual user may move at high speed toward the tree 1110 in the virtual space 2. More specifically, the virtual user may move at higher speed than the movement speed in accordance with the temporal change of the position of the HMD device 110 detected by the HMD sensor 120. At this time, the field-of-view image may be displayed so that the landscape around the virtual user and the tree 1110 moves at high speed toward the virtual user.

In FIG. 13B, the position of the virtual camera 1 is instantaneously moved to the vicinity of the tree 1110, and hence the user 190 may visually recognize the image as if the virtual user has instantaneously moved to the tree 1110.

As described above, in at least one aspect, when the virtual user throws an object to the stationary object in the virtual space 2 based on the motion of the user 190, the field-of-view image visually recognized by the virtual user is switched to a direction in which the object flies, that is, a direction in which the field of view of the virtual user moves. The motion of the user 190 includes the rotation of the arm and the gesture of throwing an object. The direction to switch the field-of-view image corresponds to such motions. Therefore, the user 190 can visually recognize the field-of-view image in the virtual space 2 in accordance with his or her motion, and hence the visually induced motion sickness may be suppressed or avoided.

[Movement of User with Respect to Stationary Object]

Next, with reference to FIG. 14 to FIG. 16, description is given of the movement of the user with respect to a moving object in the virtual space 2. According to at least one embodiment of this disclosure, a horse is exemplified as the moving object, but the moving object is not limited to the exemplified object. The moving object may be objects that move in the real space, such as other animals, automobiles, other vehicles, birds, airplanes, and rockets.

Figure 14B:
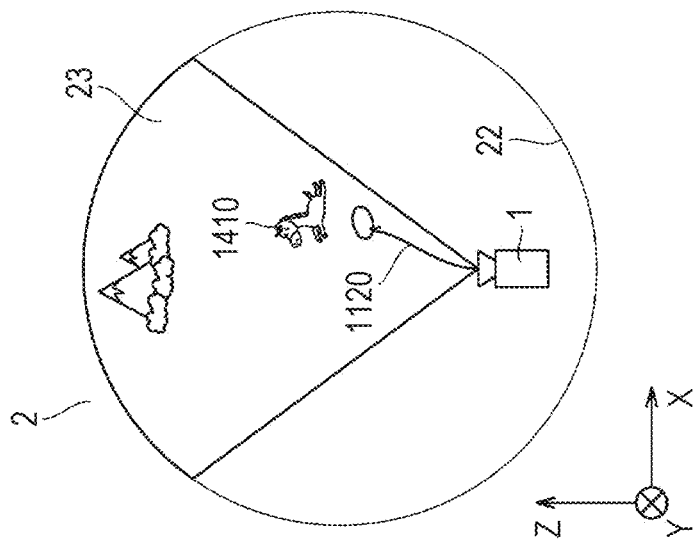
FIG. 14B A diagram of a state in which a mountain is present in the virtual space and a horse is running according to at least one embodiment of this disclosure.
Figure 14A:
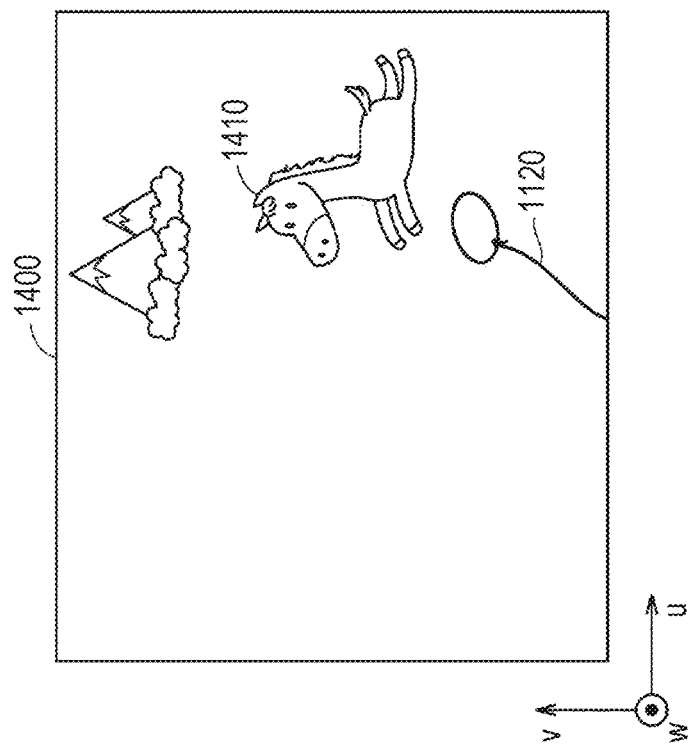
FIG. 14A A diagram of a state in which a mountain is present in the virtual space and a horse is running according to at least one embodiment of this disclosure.

FIGS. 14A and 14B are diagrams of a state in which a mountain is present in the virtual space 2 and a horse is running according to at least one embodiment of this disclosure. FIG. 14A is a diagram of a field-of-view image 1400 that is visually recognized in the virtual space 2 by the user 190 wearing the HMD device 110. FIG. 14B is a diagram of a state in which the virtual space 2 is viewed from above (Y direction). In at least one aspect, the user 190 wearing the HMD device 110 visually recognizes the field-of-view image 1400 as the virtual user. The field-of-view image 1400 displays a mountain and a horse 1410.

In FIG. 14A, when the user 190 performs a motion that is determined in advance, the processor 10 of the HMD device 110 displays a rope 1120 in the field-of-view image 1400. When the user 190 moves his or her hand, the motion sensor 130 detects the movement of the hand, and the processor 10 displays, on the monitor 112, such an image that the rope 1120 flies toward the running horse 1410. At this time, the monitor 112 displays the image so that the horse 1410 is positioned at the center of the field-of-view image 1400 in accordance with the motion of the user 190. Therefore, the direction in which the user 190 performs the motion and the direction displayed in the field-of-view image 1400 are substantially the same, and hence the VR sickness may be suppressed or avoided.

Figure 15B:
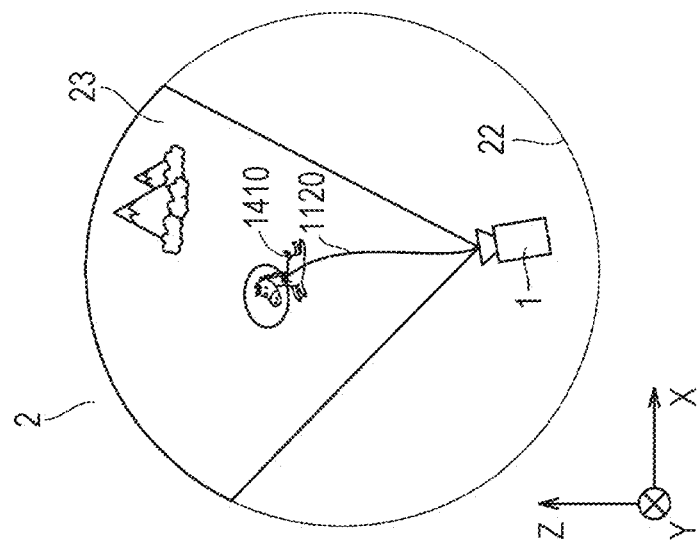
FIG. 15B A diagram of an image indicating a state in which the target has moved in the virtual space according to at least one embodiment of this disclosure.
Figure 15A:
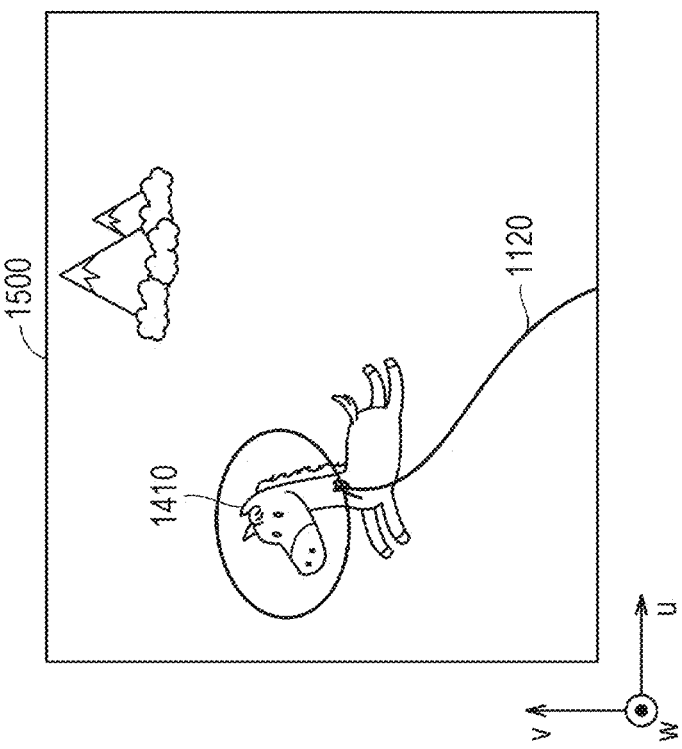
FIG. 15A A diagram of an image indicating a state in which the target has moved in the virtual space according to at least one embodiment of this disclosure.

FIGS. 15A and 15B are diagrams of an image 1500 displaying a state in which the target has moved in the virtual space 2 according to at least one embodiment of this disclosure. FIG. 15A is a diagram of a state in which the horse 1410 has run and thus the location has changed in the virtual space 2. FIG. 15B is a diagram of a state in which the virtual space 2 is viewed from above (Y direction).

As illustrated in FIG. 15A, when the user 190 performs a motion of throwing the rope 1120 toward the running horse 1410 as the virtual user in the virtual space 2, the motion sensor 130 detects the motion to detect the movement direction. For example, when the horse 1410 is running from the right to the left in the image 1500, the user 190 performs a motion of swinging his or her right hand to the front left side. Then, the processor 10 generates a signal for switching the field-of-view image to the left direction, and transmits the signal to the monitor 112.

In FIG. 15B, the direction of the virtual camera 1 corresponding to the virtual user is switched to the direction in which the horse 1410 is positioned at the center. When the monitor 112 displays the image under this state, the user 190 can visually recognize the horse 1410 at the center of the image in the virtual space 2 as the virtual user.

In at least one aspect, when the rope 1120 is caught to the horse 1410, the user 190 performs a motion of pulling the rope 1120, and thus the virtual user can be moved at high speed toward the horse 1410.

Figure 16B:
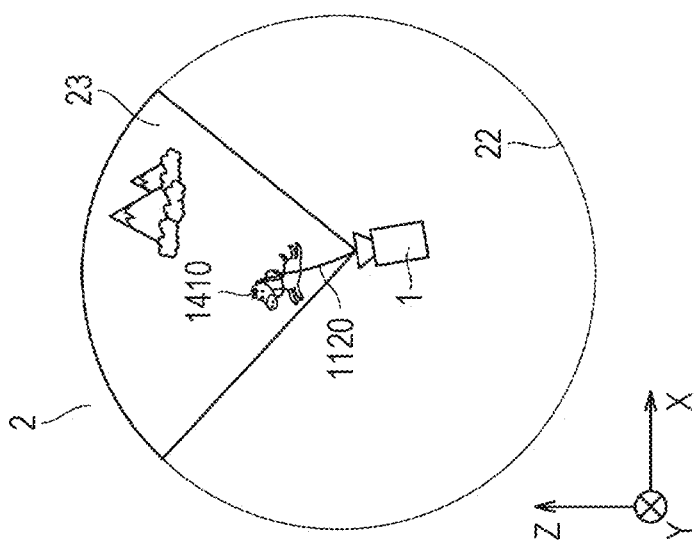
FIG. 16B A diagram of a state in which, in one aspect, the virtual user has moved to a moving object at high speed according to at least one embodiment of this disclosure.
Figure 16A:
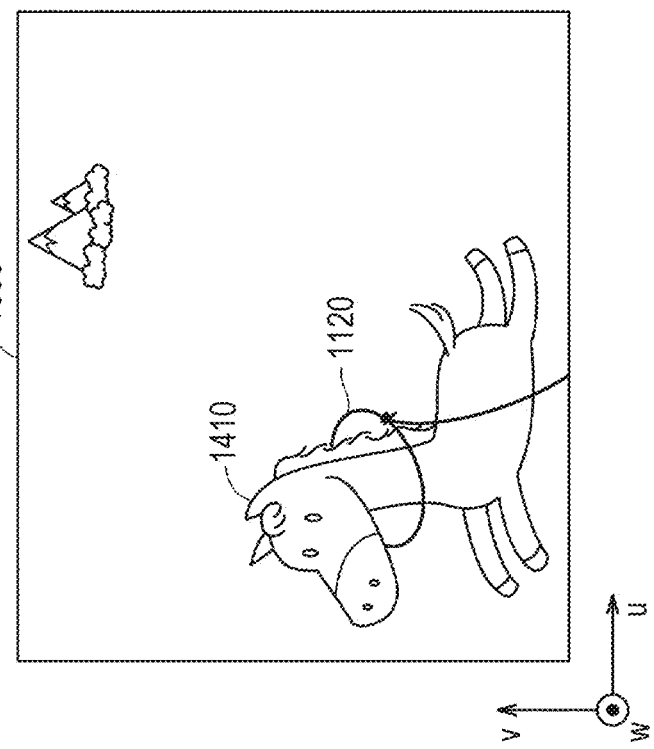
FIG. 16A A diagram of a state in which, in one aspect, the virtual user has moved to a moving object at high speed according to at least one embodiment of this disclosure.

FIGS. 16A and 16B are diagrams of a state in which, in one aspect, the virtual user has moved to a moving object at high speed according to at least one embodiment of this disclosure. HG 16A is a diagram of a field-of-view image 1600 to be visually recognized by the virtual user. FIG. 16B is a diagram of a state in which the virtual space 2 is viewed from above (Y direction).

In FIG. 16A, the virtual user can move at high speed to the target in the virtual space 2. For example, when the user 190 performs a motion of pulling the rope 1120, for example, a motion of retreating his or her hand having the motion sensor 130 mounted thereon to himself or herself under a state in which the rope 1120 is caught to the horse 1410 as in FIG. 15A, the processor 10 displays, on the monitor 11:2, such a screen that the virtual user approaches the horse 1410 at high speed. For example, such an image that the landscape around the virtual user passes behind the virtual user at high speed is displayed as the field-of-view image. In this manner, the user 190 that visually recognizes the field-of-view image can predict the movement direction that is based on his or her motion also in the virtual space 2, and hence the VR sickness may be reduced or prevented from occurring.

As described above, according to at least one embodiment of this disclosure, the movement direction of the virtual user in the virtual space 2 is displayed based on the motion of the user 190 in the real space, and hence the motion of the user 190 and the movement direction in the virtual space 2 are synchronized with each other. As a result, even when the virtual user is moved in the virtual space 2, the VR sickness may be reduced or prevented from occurring to the user 190 that has visually recognized the image at that time. The features disclosed above may be combined as appropriate.

[Configuration of HMD System]

Figure 17:
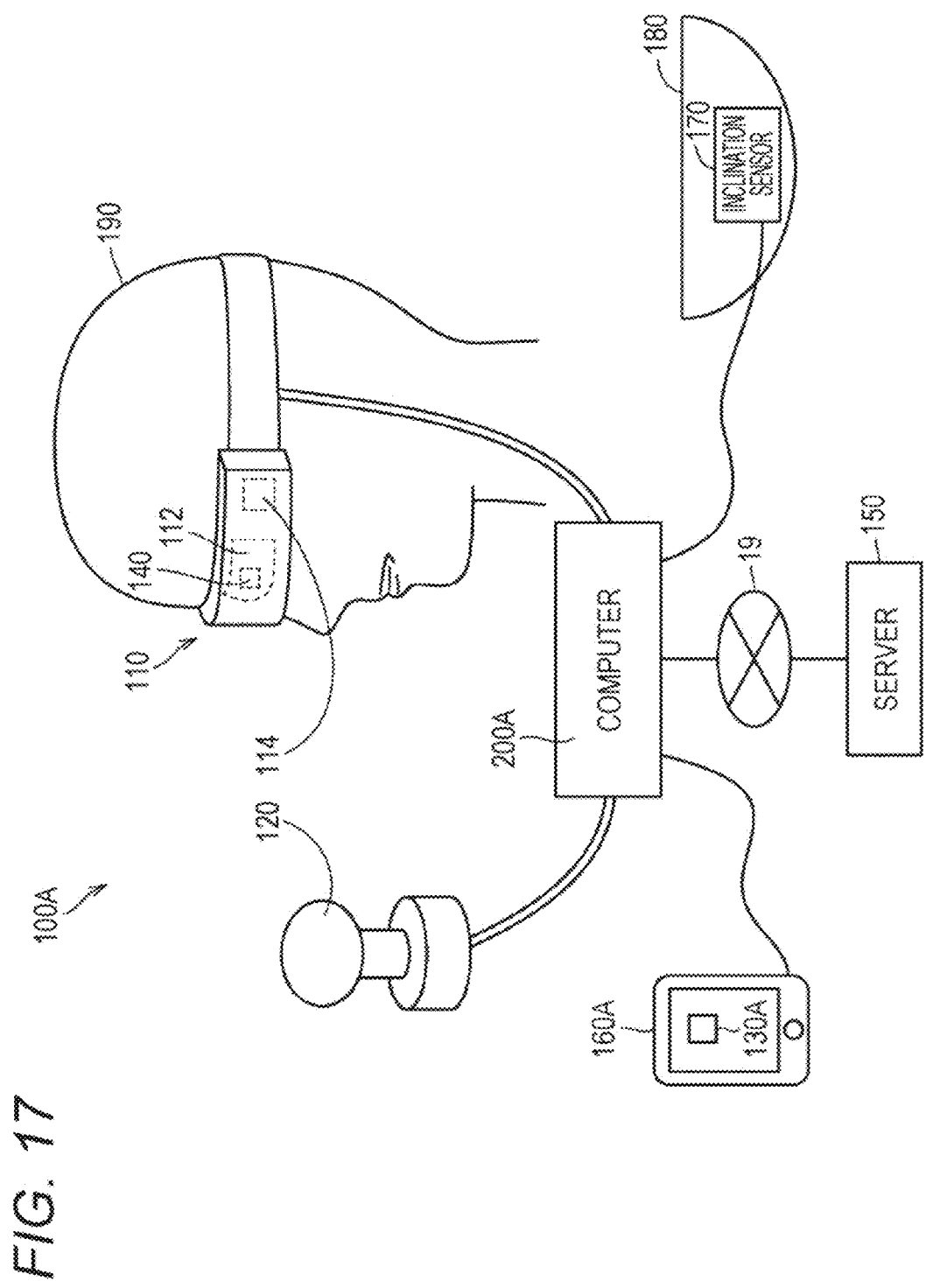
FIG. 17 A diagram of a configuration of an HMD system according to at least one embodiment of this disclosure.

With reference to FIG. 17, the configuration of the head mount display (HMD) system 100A is described. FIG. 17 is a diagram of an overview of the configuration of the HMD system 100A according to at least one embodiment of this disclosure. In at least one aspect, the HMD system 100A is provided as a system for household use or a system for professional use. Components having the same configurations as those of the above-mentioned HMD system 100A are denoted by the same reference symbols, and redundant descriptions of the functions of those components are not repeated.

In FIG. 17, the HMD system 100A according to at least one embodiment of this disclosure includes the above-mentioned HMD device 110, the above-mentioned HMD sensor 120, a board 180, and a computer 200A. The HMD device 110 includes the above-mentioned monitor 112 and the above-mentioned eye gaze sensor 140. The board 180 includes an inclination sensor 170. In at least one aspect, the computer 200A can be connected to the network 19, and can communicate to/from the server 150 connected to the network 19. In at least one aspect, the HMD device 110 may include the above-mentioned sensor 114 instead of the HMD sensor 120.

According to at least one embodiment of this disclosure, the HMD system 100A may further include a controller 160A. The controller 160A may include a motion sensor 130A.

The controller 160A is configured to receive input of a command from the user 190 to the computer 200A. In at least one aspect, the controller 160A can be held by the user 190. In at least one aspect, the controller 160A can be mounted to the body or a part of the clothes of the user 190. In at least one aspect, the controller 160A may be configured to output at least one of a vibration, a sound, or light based on the signal transmitted from the computer 200A.

In at least one aspect, the motion sensor 130A is mounted on the hand of the user to detect the movement of the hand of the user. For example, the motion sensor 130A detects the rotational speed and the number of rotations of the hand. The detection signal is transmitted to the computer 200A. The motion sensor 130A is provided to, for example, the glove-type controller 160A. According to at least one embodiment of this disclosure, for the safety in the real space, the controller 160A is desired to be mounted on an object that does not easily fly away like a glove-type object being worn on the hand of the user 190. In at least one aspect, a sensor that is not mounted on the user 190 may detect the movement of the hand of the user 190. For example, a signal of a camera that photographs the user 190 may be input to the computer 200A as a signal representing the motion of the user 190. The motion sensor 130A and the computer 200A are connected to each other through wired or wireless communication. In the case of wireless communication, the communication mode is not particularly limited, and for example, Bluetooth® or other known communication methods may be used.

The inclination sensor 170 is achieved by, for example, an acceleration sensor or a touch sensor. According to at least one embodiment of this disclosure, in a case of a member having a spherical bottom portion as the board 180, an acceleration sensor is used as the inclination sensor 170. According to at least one embodiment of this disclosure, when the user 190 uses equipment having side walls like a bobsled, a touch sensor may be arranged on each of the right and left side walls as the inclination sensor in addition to the acceleration sensor or instead of the acceleration sensor. In this case, the equipment may be detected to be inclined toward the side wall touched by the user 190.

The board 180 is configured to incline in accordance with a load applied to its upper surface. For example, in at least one aspect, the board 180 has a bottom surface that is formed to have an arc-shaped inclination. In at least one aspect, the board 180 includes a plurality of springs or other elastic members arranged so as to transmit the applied load to the floor on which the board 180 is placed.

[Hardware Configuration]

Figure 18:
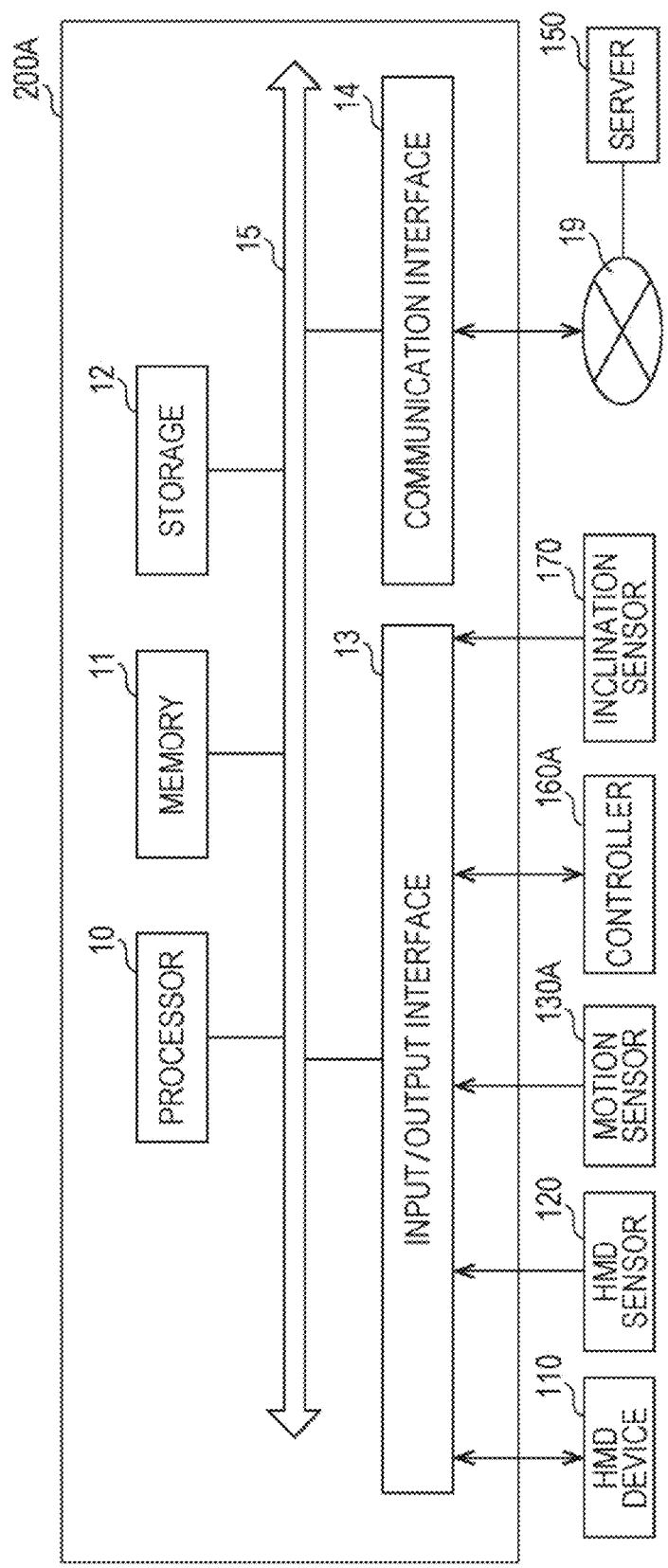
FIG. 18 A block diagram of a hardware configuration of a computer according to at least one embodiment of this disclosure.

With reference to FIG. 18, the computer 200A of this embodiment is described. FIG. 18 is a block diagram of an example of the hardware configuration of the computer 200A according to at least one embodiment of this disclosure. The computer 200A includes the above-mentioned processor 10, the above-mentioned memory 11, the above-mentioned storage 12, the above-mentioned input/output interface 13, and the above-mentioned communication interface 14. Each component is connected to the above-mentioned bus 15.

According to at least one embodiment of this disclosure, the input/output interface 13 is configured to allow communication of signals among the HMD device 110, the HMD sensor 120, the motion sensor 130A, and the inclination sensor 170. In at least one aspect, the input/output interface 13 is achieved with use of a universal serial bus (USB) interface, a digital visual interface (DVI), a high-definition multimedia interface (HDMI) (trademark), or other terminals. The input/output interface 13 is not limited to ones described above.

According to at least one embodiment of this disclosure, the input/output interface 13 may further communicate to/from the controller 160A. For example, the input/output interface 13 receives input of a signal output from the motion sensor 130A. In at least one aspect, the input/output interface 13 transmits a command output from the processor 10 to the controller 160A. The command instructs the controller 160A to vibrate, output a sound, emit light, or the like. When the controller 160A receives the command, the controller 160A executes any one of vibration, sound output, and light emission in accordance with the command.

In at least one aspect, the processor 10 loads one or more programs stored in the storage 12 to the memory 11 to execute a series of commands included in the program. The one or more programs may include an operating system of the computer 200A, an application program for providing a virtual space, and game software that can be executed in the virtual space with use of the controller 160A. The processor 10 transmits a signal for providing a virtual space to the HMD device 110 via the input/output interface 13. The HMD device 110 displays a video on the monitor 112 based on the signal.

According to at least one embodiment of this disclosure, there is provided a method of providing a virtual space to a head mounted display device by a computer. This method includes defining the virtual space by at least one processor. The method further includes detecting, by the at least one processor, a direction in which a user of the head mounted display device is inclined (for example, one of right-left direction and front-back direction). The method further includes determining, by the at least one, processor, a movement direction of a virtual user corresponding to the user 190 in the virtual space based on the direction in which the user 190 is inclined. The method further includes causing, by the at least one processor, the head mounted display device to display a field of view of the virtual user in the virtual space so that the field of view is moved in the determined movement direction of the virtual user.

According to at least one embodiment of this disclosure, the step of determining a movement direction includes determining the movement direction in accordance with a time for which the inclination of the user 190 is continued.

According to at least one embodiment of this disclosure, the step of determining a movement direction includes determining the movement direction in accordance with a degree of the inclination of the user 190.

According to at least one embodiment of this disclosure, the method further includes a step of determining, by the at least one processor, a movement distance of the virtual user in the virtual space based on the detected inclination of the user 190. The step of causing the head mounted display device to display a field of view includes causing the head mounted display device to display the field of view of the virtual user so that the field of view is moved by the movement distance in the movement direction.

According to at least one embodiment of this disclosure, a method of providing a virtual space to a head mounted display device by a computer is disclosed. The method includes defining a virtual space by at least one processor. The method further includes detecting, by the at least one processor, a direction in which a user of the head mounted display device is inclined. The method further includes determining, by the at least one processor, a movement distance of a virtual user in the virtual space based on the detected inclination of the user 190. The method further includes causing, by the at least one processor, the head mounted display device to display a field of view of the virtual user in the virtual space so that the field of view is moved by the determined movement distance of the virtual user.

According to at least one embodiment of this disclosure, the step of determining a movement distance includes determining the movement distance in accordance with a time for which the inclination of the user 190 is continued.

According to at least one embodiment of this disclosure, the step of determining a movement distance includes determining the movement distance in accordance with a degree of the inclination of the user 190.

According to at least one embodiment of this disclosure, the step of detecting a direction in which the user 190 is inclined includes a step of detecting an acceleration based on a posture or a motion performed by the user 190 through weight shift.

According to at least one embodiment of this disclosure, the step of detecting a direction in which the user 190 is inclined includes detecting a load applied from the user 190.

According to at least one embodiment of this disclosure, the processor is configured to define a virtual space, detect a direction in which a user of the head mounted display device is inclined, determine a movement direction of a virtual user in the virtual space based on the detected direction, and cause the head mounted display device to display a field of view of the virtual user in the virtual space so that the field of view is moved in the determined movement direction of the virtual user.

According to at least one embodiment of this disclosure, the processor is further configured to determine a movement distance of the virtual user in the virtual space based on the detected inclination of the user 190. Causing the head mounted display device to display a field of view includes causing the head mounted display device to display the field of view of the virtual user so that the field of view is moved by the movement distance in the movement direction.

According to at least one embodiment of this disclosure, the processor is configured to define a virtual space, detect a direction in which a user of the head mounted display device is inclined, determine a movement distance of a virtual user in the virtual space based on the detected direction, and cause the head mounted display device to display a field of view of the virtual user in the virtual space so that the field of view is moved by the determined movement distance of the virtual user.

[Control Device of HMD Device]

Figure 19:
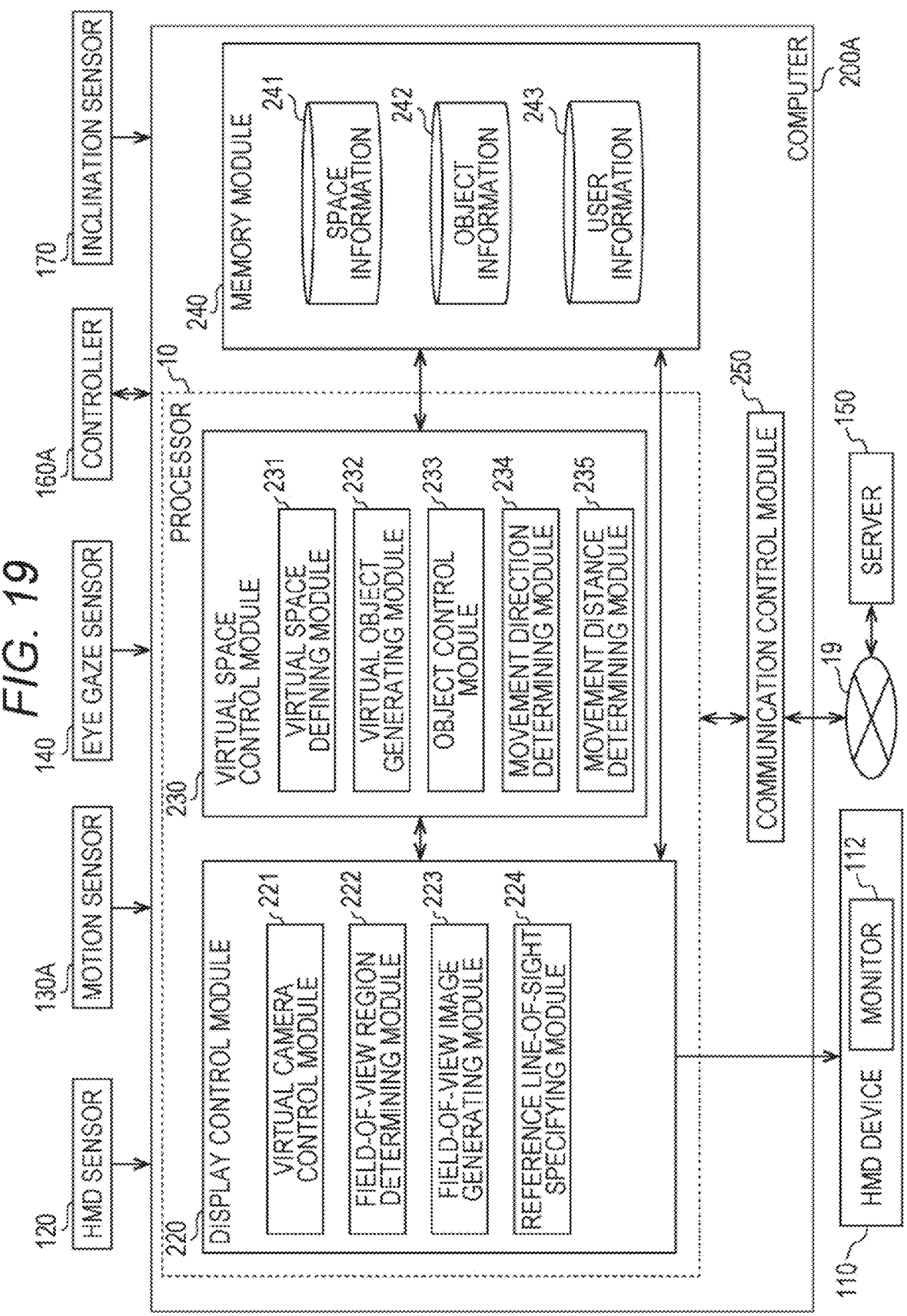
FIG. 19 A block diagram of the computer of at east one embodiment his disclosure as a module configuration.

With reference to FIG. 19, the control device of the HMD device 110 is described. According to at least one embodiment of this disclosure, the control device is achieved by the computer 200A having a known configuration. FIG. 19 is a block diagram of the computer 200A of one embodiment of this disclosure as a module configuration according to at least one embodiment of this disclosure.

In FIG. 19, the computer 200A includes the above-mentioned display control module 220, the above-mentioned virtual space control module 230, the above-mentioned memory module 240, and the above-mentioned communication control module 250. The display control module 220 includes, as sub-modules, the above-mentioned virtual camera control module 221, the above-mentioned field-of-view region determining module 222, the above-mentioned field-of-view image generating module 223, and the above-mentioned reference line-of-sight specifying module 224. The virtual space control module 230 includes, as sub-modules, the above-mentioned virtual space defining module 231, the above-mentioned virtual object generating module 232, the above-mentioned object control module 233, a movement direction determining module 234, and a movement distance determining module 235.

The movement direction determining module 234 is configured to determine the movement direction of the virtual user in the virtual space 2 based on the output from the inclination sensor 170. According to at least one embodiment of this disclosure, the movement direction determining module 234 is configured to detect the direction in which a load is applied by the user 190 based on the signal output from the inclination sensor 170, to thereby determine the direction as a direction to move the virtual user.

The movement distance determining module 235 is configured to determine the movement distance of the virtual user based on the output from the inclination sensor 170. For example, when the board 180 in a horizontal state is inclined, the movement distance determining module 235 determines the movement distance in accordance with an inclination angle. In at least one aspect, the movement distance determining module 235 is configured to determine the movement distance of the virtual user based on a virtual movement distance per degree of inclination angle defined in advance in the program executed by the processor 10, and on the inclination angle. According to at least one embodiment of this disclosure, the movement distance determining module 235 is configured to determine the movement distance of the virtual user based on the time for which the inclination is continued. For example, the movement distance determining module 235 may determine the movement distance of the virtual user based on a product of the virtual movement distance per time defined in advance in the program executed by the processor 10 and the time for which the inclination is continued.

[Control Structure]

Figure 20:
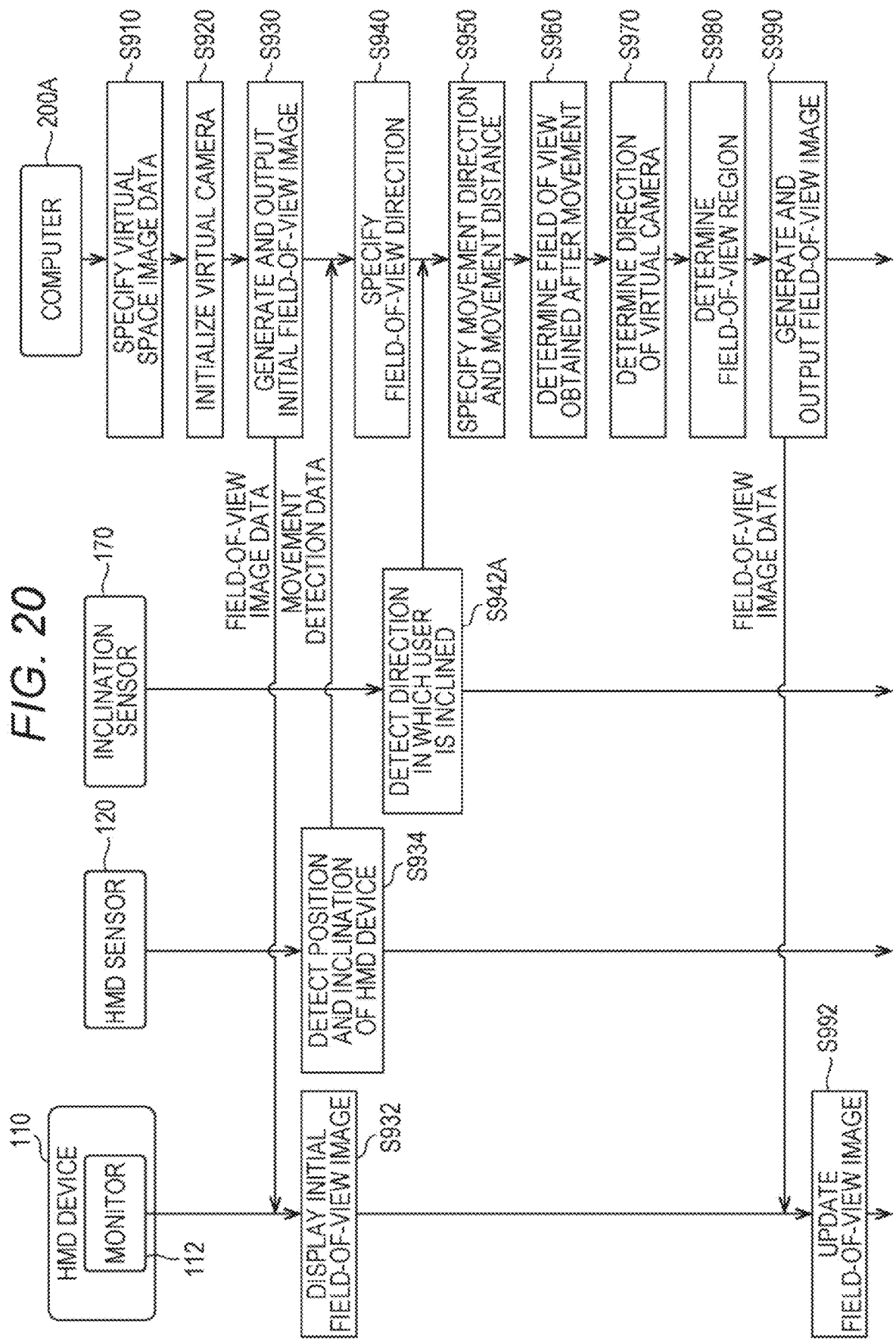
FIG. 20 A flow chart of processing to be executed in the HMD system according to at least one embodiment of this disclosure.

With reference to FIG. 20, the control structure of the HMD system 100A is described. FIG. 20 is a flow chart of processing to be executed by the HMD system 100A according to at least one embodiment of this disclosure. In FIG. 20, the processing other than Step S942A is similar to the processing described above, and hence redundant description is not repeated.

In Step S940, the processor 10 specifies the field-of-view direction of the user 190 wearing the HMD device 110 based on the position and the inclination of the HMD device 110. The processor 10 executes an application program to display an object in the virtual space 2 based on the command included in the application program. The user 190 enjoys the content that can be visually recognized in the virtual space 2 through execution of the application program. In at least one aspect, examples of the content include bobsled, other sports using sleds, skiing, and snowboarding. According to at least one embodiment of this disclosure, the user 190 may sit on the board 180 and change his or her posture in accordance with the transition of the image displayed on the monitor 112.

In Step S942A, the inclination sensor 170 detects the direction in which the user 190 is inclined. The signal representing the detected inclination is transmitted to the computer 200A. The signal includes an inclination angle of the board 180. For example, in at least one aspect, when an application program of a downhill race like bobsled is executed, there may be a scene in which the virtual user present in the virtual space 2 controls the traveling direction of the bobsled displayed in the virtual space 2 in accordance with the inclination of the user 190. In this case, when the user 190 inclines his or her body, the inclination sensor 170 detects the direction of the inclination.

In Step S950, the processor 10 determines the movement direction and the movement distance of the virtual user based on the signal output from the inclination sensor 170. In at least one embodiment, the movement direction includes a direction in which the virtual user or a sled or other types of equipment on which the virtual user is sitting travels in the virtual space 2. In at least one aspect, when only the movement direction is required, the processor 10 may serve as the movement direction determining module 234 to determine only the movement direction. In at least one aspect, when only the movement distance is required, the processor 10 may serve as the movement distance determining module 235 to determine only the movement distance.

In at least one aspect, the processor 10 may be configured to determine the movement direction and a movement speed of the virtual user based on the signal output from the inclination sensor 170. The movement speed of the virtual user may be set to be increased as the inclination angle of the board 180 is increased.

In Step S960, the processor 10 determines the field of view obtained after the movement of the virtual user based on the determined movement direction and movement distance.

In Step S970, the processor 10 determines the position and the direction of the virtual camera 1 in the virtual space 2 based on the determined movement direction and movement distance.

In Step S980, the processor 10 determines the field-of-view region based on the determined position and direction of the virtual camera 1. In at least one embodiment, the field-of-view region represents a range that the virtual user can visually recognize in the virtual space 2.

In Step S990, the computer 200A generates the field-of-view image data for displaying the field-of-view image in accordance with the determined field-of-view region, and outputs the generated field-of-view image data to the HMD device 110. The field-of-view image data is configured to enable display of a mode in which a landscape around the virtual user approaches the virtual user at high speed so that the virtual user moves at high speed in the determined movement direction.

In Step S992, the monitor 112 of the HMD device 110 updates the field-of-view image based on the received field-of-view image data, and displays the updated field-of-view image. The user 190 can recognize the updated field-of-view image, that is, the field of view obtained after the line of sight has been moved in the movement direction. While the above description refers to processor 10, one of ordinary skill in the art would recognize that the functions of processor 10 could be separated among a plurality of processors.

Figure 21:
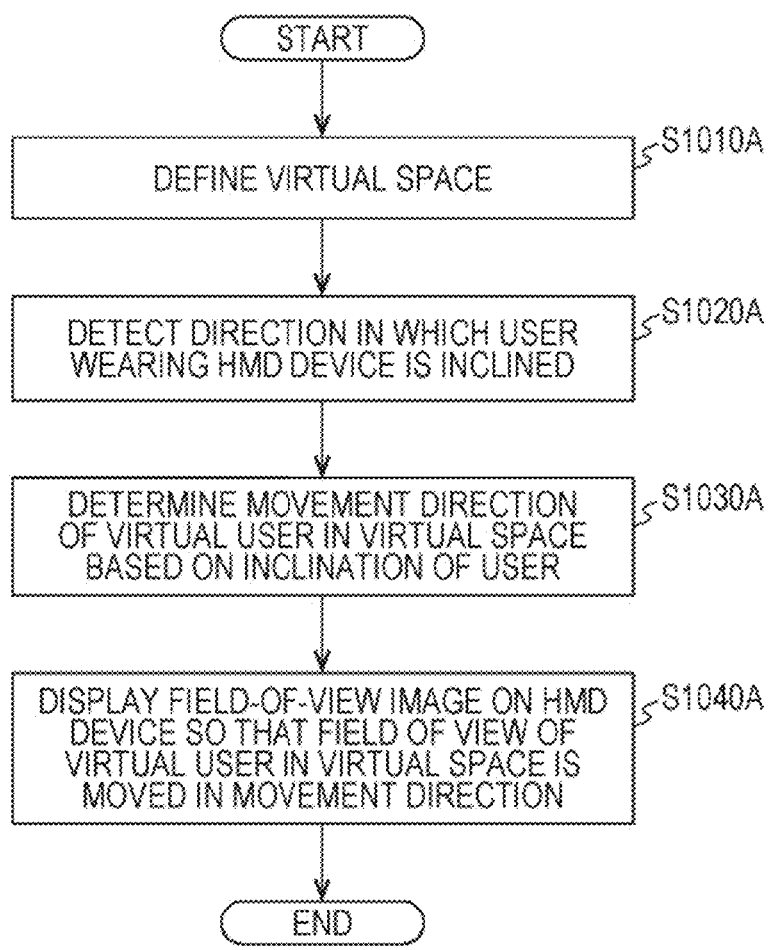
FIG. 21 A flow chart of processing to be executed by the computer in accordance with a motion of the user sitting on a board according to at least one embodiment of this disclosure.

With reference to FIG. 21, the control structure of the computer 200A is further described. FIG. 21 is a flow chart of the processing to be executed by the computer 200A in accordance with the motion of the user 190 sitting on the board 180 according to at least one embodiment of this disclosure.

In Step S1010A, the processor 10 serves as the virtual space defining module 231 to define the virtual space 2 in the memory 11.

In Step S1020A, the processor 10 detects the direction in which the user 190 wearing the HMD device 110 and sitting on the board 180 is inclined, specifically, the right, left, front, or back direction based on the signal from the inclination sensor 170.

In Step S1030A, the processor 10 determines the movement direction of the virtual user traveling in the virtual space 2 based on the inclination of the user 190. For example, when the user 190 inclines his or her body to the right side for a certain time period, the processor 10 determines that the virtual user or a vehicle on which the virtual user is sitting is moved to the right side. In at least one aspect, the processor 10 determines the direction in which the virtual user is moved to the right side in accordance with the number of times that the user 190 performs the motion of temporarily inclining his or her body. For example, when the user 190 performs a motion of inclining his or her body once within a time period defined in advance, the processor 10 determines that the virtual user is moved by one degree to the right side with respect to the traveling direction. When the user 190 performs the motion 10 times, the processor 10 determines that the virtual user is moved by 10 degrees to the right side.

In at least one aspect, also when the user 190 performs a motion of inclining his or her body to the left side, similarly to the case where the motion of inclining the body to the right side is performed, the processor 10 determines the left movement direction.

According to at least one embodiment of this disclosure, the inclination sensor 170 may detect that the user 190 has inclined his or her body forward. At this time, the processor 10 may detect that the user 190 has inclined his or her body forward in accordance with the signal from the inclination sensor 170, and may determine the movement distance based on the inclination angle. For example, in a case where the program executed by the processor 10 predetermines to move the virtual user by 10 meters when the forward inclination of one degree is detected, when the processor 10 detects that the user 190 has inclined forward by 5 degrees, the processor 10 determines to move the virtual user by 50 meters in the virtual space 2.

In Step S1040A, the processor 10 serves as the virtual object generating module 232 to generate the field-of-view image data for displaying the field-of-view image on the HMD device 110 so that the field of view of the virtual user in the virtual space 2 is moved in the movement direction determined in Step S1030A. According to at least one embodiment of this disclosure, the processor 10 generates the field-of-view image data in which, in addition to the movement direction, the movement distance obtained based on the time for which the inclination of the user 190 is continued is reflected. The processor 10 transmits the generated field-of-view image data to the HMD device 110, and the HMD device 110 displays the field-of-view image on the monitor 112 based on the field-of-view image data. While the above description refers to processor 10, one of ordinary skill in the art would recognize that the functions of processor 10 could be separated among a plurality of processors.

[Movement of Sitting User]

With reference to FIG. 22A to FIG. 24C, one mode of detecting the inclination of the user 190 is described.

Figure 22A:
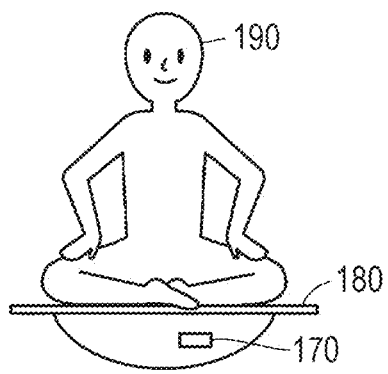
FIG. 22A A diagram of a mode in which the user is sitting on the board of at least one embodiment of this disclosure.
Figure 22B:
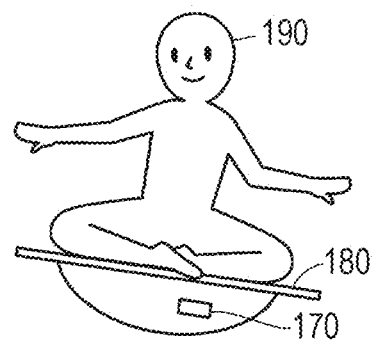
FIG. 22B A diagram of a mode in which the user is sitting board of at least one embodiment of this disclosure.
Figure 22C:
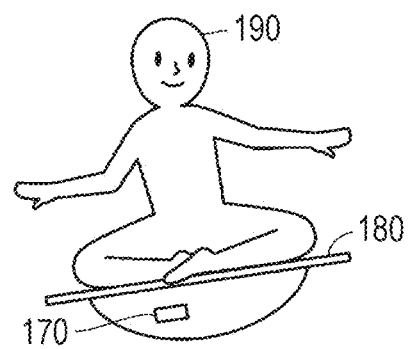
FIG. 22C A diagram of a mode in which the user is sitting on the board of at least one embodiment of this disclosure.

FIGS. 22A, 22B and 22C are diagrams of a mode in which the user 190 is sitting on the board 180 of at least one embodiment of this disclosure. FIG. 22A is a diagram of a mode in which the user 190 wearing the HMD device 110 (not shown) is sitting on the board 180 while maintaining the horizontal state. FIG. 22B is a diagram of a mode in which the user 190 shifts his or her weight to incline the board 180 to the left side as viewed from the user 190. FIG. 22C is a diagram of a state in which the user shifts his or her weight to incline the board 180 to the right side as viewed from the user 190. When the board 180 is inclined, the inclination sensor 170 outputs a signal corresponding to the direction. The output signal is input to the computer 200A. The direction in which the inclination is detected is not limited to the left as in FIG. 22B or to the right as in FIG. 22C. According to at least one embodiment of this disclosure, the inclination sensor 170 may detect the forward inclination when the user 190 shifts his or her weight forward or the backward inclination when the user 190 shifts his or her weight backward.

Figure 23A:
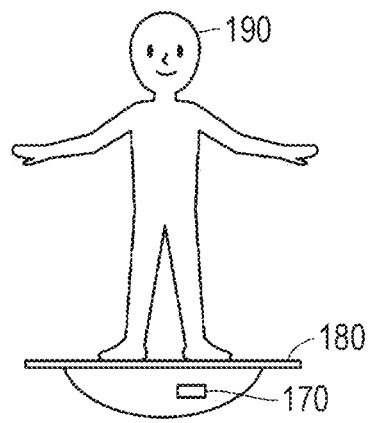
FIG. 23A A diagram of a mode in which the user is standing on the board of at east one embodiment of this disclosure.
Figure 23B:
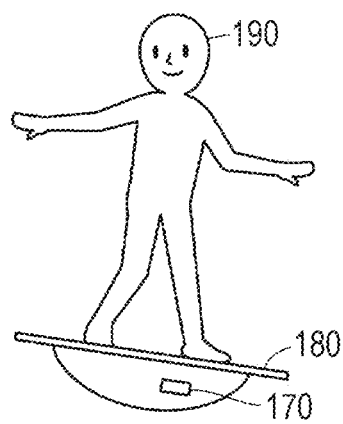
FIG. 23B A diagram of a mode in which the user is standing on the board of at least one embodiment of this disclosure.
Figure 23C:
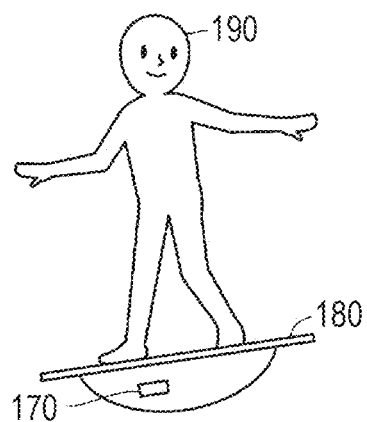
FIG. 23C A diagram of a mode in which the user is standing on the board of at least one embodiment of this disclosure.

FIGS. 23A, 23B and 23C are diagrams of a mode in which the user 190 is standing on the board 180 of at least one embodiment of this disclosure. FIG. 23A is a diagram of a mode in which the user 190 wearing the HMD device 110 (not shown) is sitting on the board 180 while maintaining the horizontal state. FIG. 23B is a diagram of a mode in which the user 190 shifts his or her weight to incline the board 180 to the left side as viewed from the user 190. FIG. 23C is a diagram of a state in which the user shifts his or her weight to incline the board 180 to the right side as viewed from the user 190. When the board 180 is inclined, the inclination sensor 170 outputs a signal corresponding to the direction. The output signal is input to the computer 200A. The direction in which the inclination is detected is not limited to the left as in FIG. 23B or to the right as in FIG. 23C. According to at least one embodiment of this disclosure, the inclination sensor 170 may detect the forward inclination when the user 190 shifts his or her weight forward or the backward inclination when the user 190 shifts his or her weight backward. The user 190 can predict the movement direction of the virtual user in the virtual space 2 in accordance with his or her weight shift, and hence a so-called visually induced motion sickness (VR sickness) can be reduced or prevented without reducing the user's sense of immersion.

Figure 24A:
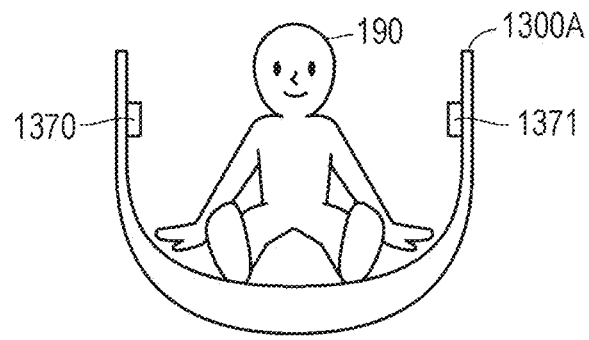
FIG. 24A A diagram of a mode in which the user is sitting on a sled of at least one embodiment of this disclosure.
Figure 24B:
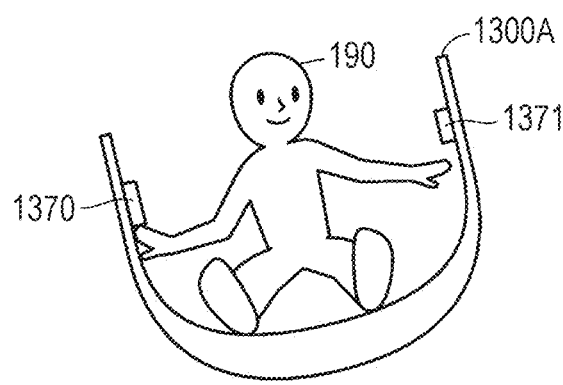
FIG. 24B A diagram of a mode in which the user is sitting on a sled of at least one embodiment of this disclosure.
Figure 24C:
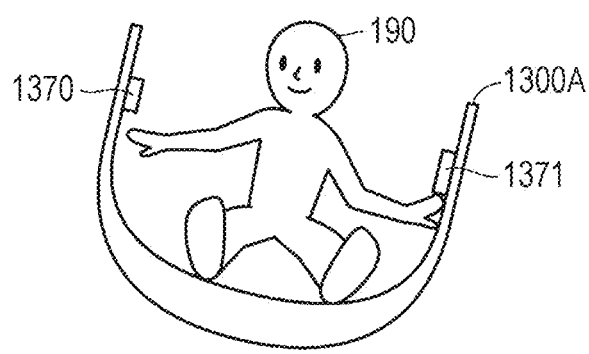
FIG. 24C A diagram of a mode in which the user is sitting on a sled of at least one embodiment of this disclosure.

With reference to FIGS. 24A, 24B and 24C, another mode of detection of the inclination is described. FIGS. 24A, 24B and 24C are diagrams of a mode in which the user 190 is sitting on a sled 1300A in at least one embodiment of this disclosure. On both side surfaces of the sled 1300A, touch sensors 1370 and 1371 are arranged. The output of the touch sensors 1370 and 1371 is connected to an input interface of the computer 200A. In at least one aspect, one or more sleds 1300A may be provided in a playground.

FIG. 24A is a diagram of a mode in which the user 190 wearing the HMD device 110 (not shown) is sitting on the sled 1300A while maintaining the horizontal state. At this time, the user 190 is not touching the touch sensor 1370 or 1371.

FIG. 24B is a diagram of a mode in which the user 190 shifts his or her weight to incline the sled 1300A to the right side as viewed from the user 190. When the sled 1300A is inclined to the right side and thus the right hand of the user touches the touch sensor 1370, a signal output from the touch sensor 1370 is input to the computer 200A. The processor 10 detects that the sled 1300A has inclined to the right side based on the signal. Further, the processor 10 generates the field-of-view image data so that the field of view from the front right side of the virtual user in the virtual space 2 may be recognized by the user 190. The processor 10 transmits the field-of-view image data to the HMD device 110, and the HMD device 110 displays the image based on the field-of-view image data on the monitor 112. When the user 190 views the image, the user 190 feels like the user is moving in the right direction in the virtual space 2.

FIG. 24C is a diagram of a state in which the user 190 shifts his or her weight to incline the sled 1300A to the left side as viewed from the user 190. When the sled 1300A is inclined to the left side and thus the left hand of the user touches the touch sensor 1371, a signal output from the touch sensor 1371 is input to the computer 200A. The processor 10 detects that the sled 1300A has inclined to the left side based on the signal. Further, the processor 10 generates the field-of-view image data so that the field of view from the front left side of the virtual user in the virtual space 2 may be recognized by the user 190. The processor 10 transmits the field-of-view image data to the HMD device 110 to display the image based on the field-of-view image data on the monitor 112. When the user 190 views the image, the user 190 feels like the user is moving in the left direction in the virtual space 2.

Also in the example illustrated in FIGS. 24A-C, similarly to FIGS. 22A-C or FIGS. 23A-C, the inclination sensor 170 may be arranged on the bottom portion of the sled 1300A instead of the touch sensors 1370 and 1371.

Next, with reference to FIG. 25A to FIG. 27B, the movement of the virtual user in the virtual space 2 is described. According to at least one embodiment of this disclosure, the user 190 wearing the HMD device 110 visually recognizes a field-of-view image 1400A in the virtual space 2 as the virtual user.

Figure 25B:
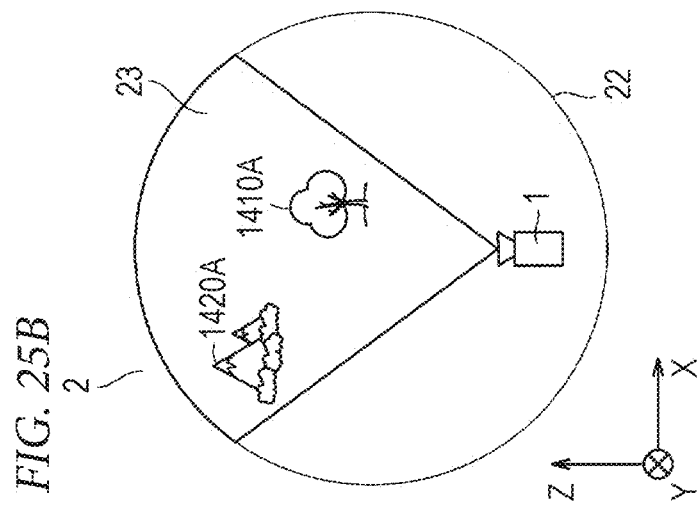
FIG. 25B A diagram of a case where the board or the sled on which the user is sitting or standing is maintained in a horizontal state according to at least one embodiment of this disclosure.
Figure 25A:
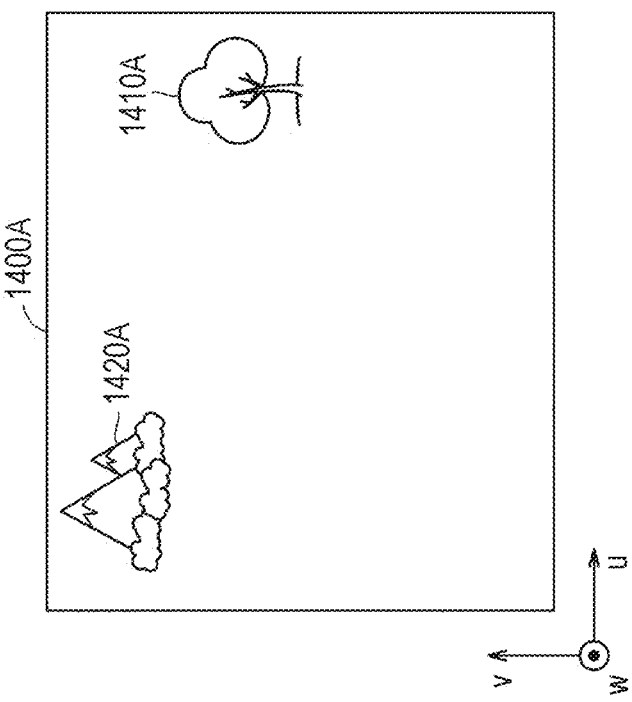
FIG. 25A A diagram of a case where the board or the sled on which the user is sitting or standing is maintained in a horizontal state according to at least one embodiment of this disclosure.

FIGS. 25A and 25B are diagrams of a case where the board 180 or the sled 1300A on which the user 190 is sitting or standing is maintained in a horizontal state according to at least one embodiment of this disclosure. At this time, the processor 10 determines that the user 190 is maintaining the horizontal state based on the signal output from the inclination sensor 170 or the touch sensors 1370 and 1371. Further, the processor 10 generates such field-of-view image data that the image in the horizontal state is visually recognized in the virtual space 2, and transmits the field-of-view image data to the monitor 112 of the HMD device 110.

As in FIG. 25A, when the monitor 11:2 displays an image based on the field-of-view image data, the user 190 recognizes the field-of-view image 1400A as the virtual user. At this time, as in FIG. 25B, the virtual camera 1 corresponding to the virtual user captures the field-of-view region 23 corresponding to the field of view of the virtual user.

[Movement to Right Side]

FIGS. 26A and 26B are diagrams of a case where the user 190 maintaining a horizontal state leans to the right side to incline the board 180 or the sled 1300A to the right side according to at least one embodiment of this disclosure. At this time, the processor 10 determines that the user 190 is inclined to the right side based on the signal output from the inclination sensor 170 or the touch sensors 1370 and 1371. Further, the processor 10 generates the field-of-view image data in which the virtual user in the virtual space 2 is recognized as having moved to the right side from the original location (for example, see FIGS. 25A and 25B). For example, the processor 10 generates the field-of-view image data for displaying the field-of-view image so that the image that is recognized in the virtual space 2 flows from the right to the left, and transmits the field-of-view image data to the HMD device 110.

As in FIG. 26A, the monitor 112 displays a field-of-view image 1500A based on the field-of-view image data. A tree 1410A displayed on the right in the field-of-view image 1400A is moved to the center of the field-of-view image 1500A.

As in FIG. 26B, such movement corresponds to, for example, movement of the virtual camera 1 assumed in the virtual space 2 to the front of the tree 1410A. The processor 10 generates the field-of-view image data in order to display an image similar to the image recognized in accordance with the movement of the virtual camera 1.

The transition from the field-of-view image 1400A to the field-of-view image 1500A is performed based on the shift of the weight of the user 190 to the right side. In this manner, the user 190 can recognize the movement in the virtual space 2 due to the transition of the field-of-view image in accordance with his or her motion corresponding to the weight shift to the right side, and hence the inclination of the user 190 and the movement direction in the virtual space 2 are synchronized with each other. As a result, occurrence of a so-called VR sickness may be suppressed or avoided.

[Movement to Left Side]

FIGS. 27A and 27B are diagrams of a case where the user 190 maintaining the horizontal state leans to the left side to incline the board 180 or the sled 1300A to the left side according to at least one embodiment of this disclosure. At this time, the processor 10 determines that the user 190 is inclined to the left side based on the signal output from the inclination sensor 170 or the touch sensors 1370 and 1371. Further, the processor 10 generates the field-of-view image data in which the virtual user in the virtual space 2 is recognized as having moved to the left side from the original location (for example, see FIGS. 25a and 25B). For example, the processor 10 generates the field-of-view image data for displaying the field-of-view image so that the image that is recognized in the virtual space 2 flows from the left to the right, and transmits the field-of-view image data to the HMD device 110.

As in FIG. 27A, the monitor 112 displays a field-of-view image 1600A based on the field-of-view image data. A mountain 1420A that has been displayed on the left in the field-of-view image 1400A is moved to the center of the field-of-view image 1600A.

As in FIG. 27B, such movement corresponds to, for example, movement of the virtual camera 1 assumed in the virtual space 2 to the front of the mountain 1420A. The processor 10 generates the field-of-view image data in order to display an image similar to the image recognized in accordance with the movement of the virtual camera 1.

The transition from the field-of-view image 1400A to the field-of-view image 1600A is performed based on the shift of the weight of the user 190 to the left side. In this manner, the user 190 can recognize the movement in the virtual space 2 due to the transition of the field-of-view image in accordance with his or her motion corresponding to the weight shift to the left side, and hence the inclination of the user 190 and the movement direction in the virtual space 2 are synchronized with each other. As a result, occurrence of a so-called VR sickness may be suppressed or avoided.

[Movement to Forward Side]

Figure 28B:
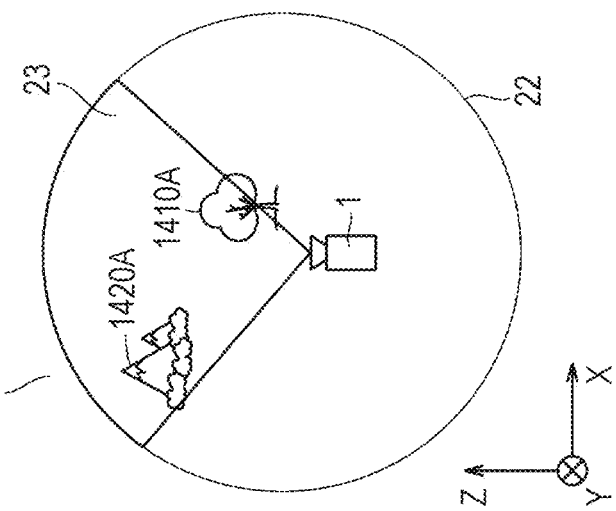
FIG. 28B A diagram of a case where the user maintaining the horizontal state leans forward to incline the board forward according to at least one embodiment of this disclosure.
Figure 28A:
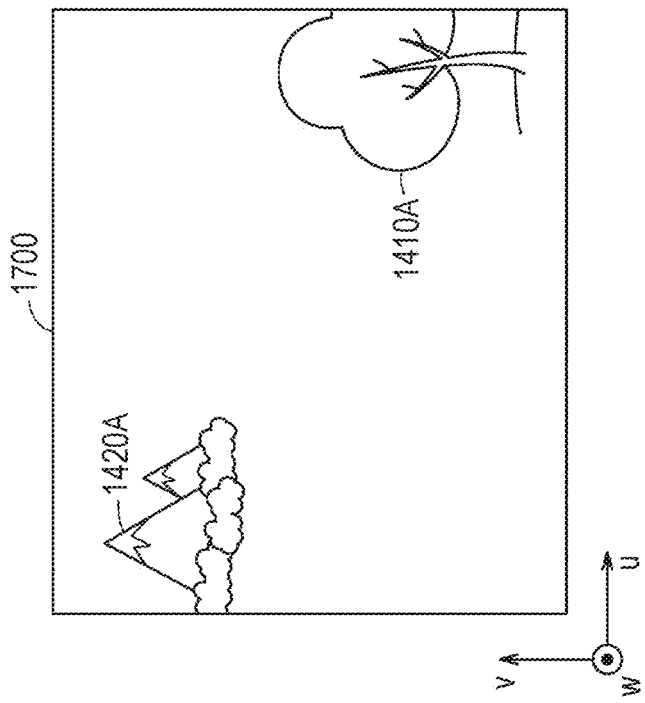
FIG. 28A A diagram of a case where the user maintaining the horizontal state leans forward to incline the board forward according to at least one embodiment of this disclosure.

FIGS. 28A and B are diagrams of a case where the user 190 maintaining the horizontal state leans forward to incline the board 180 forward according to at least one embodiment of this disclosure. The processor 10 determines that the user 190 is inclined to the forward side based on the signal output from the inclination sensor 170. Further, the processor 10 generates the field-of-view image data in which the virtual user in the virtual space 2 is recognized as having moved to the forward side from the original location (for example, see FIGS. 25A and 25B). For example, the processor 10 generates the field-of-view image data for displaying the field-of-view image so that the image that is recognized in the virtual space 2 is approaching at high speed, and transmits the field-of-view image data to the HMD device 110.

As in FIG. 28A, the monitor 112 displays a field-of-view image 1700 based on the field-of-view image data. The tree 1410A and the mountain 1420A that have been displayed small at far places in the field-of-view image 1400A are displayed large in accordance with the movement distance in the virtual space 2. In at least one aspect, the movement distance in the virtual space 2 may be calculated based on, for example, the angle of the forward inclination of the user 190 and on the movement distance per unit angle determined in advance. In at least one aspect, the movement distance may be calculated based on the time for which the state of the forward inclination is continued and on the movement distance per unit time determined in advance.

As in FIG. 28B, the movement of the field-of-view image in the virtual space 2 corresponds to, for example, movement of the virtual camera 1 assumed in the virtual space 2 at high speed toward the tree 1410A or the mountain 1420A. The processor 10 generates the field-of-view image data in order to display an image similar to the image recognized in accordance with the movement of the virtual camera 1.

The transition from the field-of-view image 1400A to the field-of-view image 1700 is performed based on the shift of the weight of the user 190 to the front side. The user 190 can recognize the movement in the virtual space 2 in accordance with his or her motion corresponding to the weight shift, and hence the inclination of the user 190 and the movement direction in the virtual space 2 are synchronized with each other. As a result, occurrence of a so-called VR sickness may be suppressed or avoided.

[Movement to Backward Side]

Figure 29A:
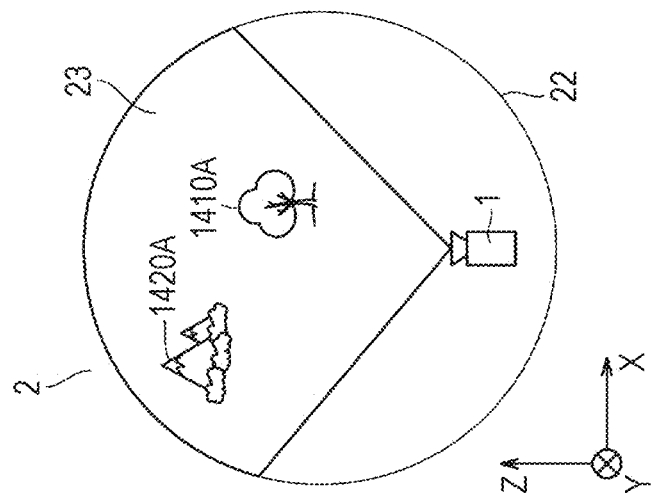
FIG. 29A A diagram of a case where the user maintaining the horizontal state leans backward to incline the board backward according to at least one embodiment of this disclosure.
Figure 29B:
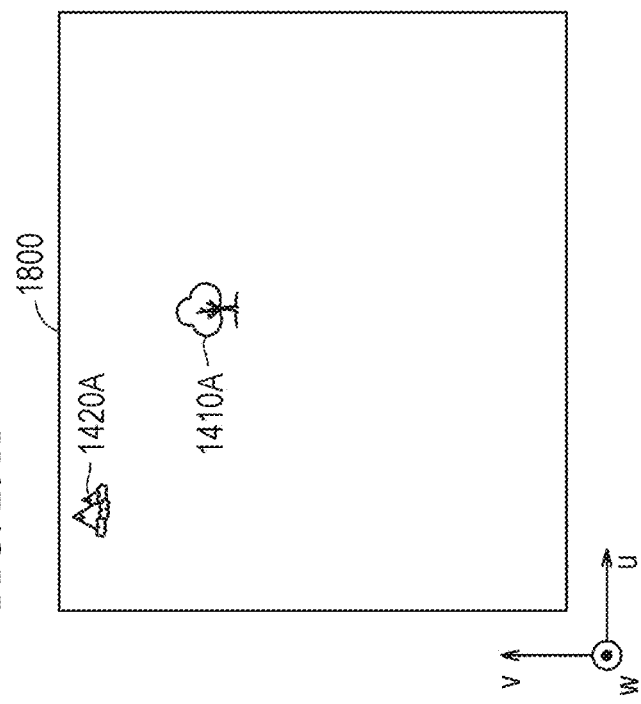
FIG. 29B A diagram of a case where the user maintaining the horizontal state leans backward to incline the board backward according to at least one embodiment of this disclosure.

FIGS. 29A and 29B are diagrams of a case where the user 190 maintaining the horizontal state leans backward to incline the board 180 backward according to at least one embodiment of this disclosure. The processor 10 determines that the user 190 is inclined to the backward side based on the signal output from the inclination sensor 170. Further, the processor 10 generates the field-of-view image data in which the virtual user in the virtual space 2 is recognized as having moved to the backward side from the original location (for example, see FIGS. 25a and 25B). For example, the processor 10 generates the field-of-view image data for displaying the field-of-view image so that the image that is recognized in the virtual space 2 is moving away, and transmits the field-of-view image data to the HMD device 110.

As in FIG. 29A, the monitor 112 displays a field-of-view image 1800 based on the field-of-view image data. The tree 1410A and the mountain 1420A that have been displayed in the field-of-view image 1400A are displayed smaller as compared to the case illustrated in FIGS. 25A and 25B. For example, the tree 1410A and the mountain 1420A are displayed smaller in accordance with the movement distance in the virtual space 2. In at least one aspect, the movement distance in the virtual space 2 may be calculated based on, for example, the angle of the backward inclination the user 190 and on the movement distance per unit angle determined in advance. In at least one aspect, the movement distance may be calculated based on the time for which the state of the backward inclination is continued and on the movement distance per unit time determined in advance.

As in FIG. 29B, the movement of the field-of-view image in the virtual space 2 corresponds to, for example, movement of the virtual camera 1 assumed in the virtual space 2 at high speed in a direction departing from the tree 1410A or the mountain 1420A. The processor 10 generates the field-of-view image data in order to display an image similar to the image recognized in accordance with the movement of the virtual camera 1.

The transition from the field-of-view image 1400A to the field-of-view image 1800 is performed based on the shift of the weight of the user 190 to the back side. The user 190 can recognize the movement in the virtual space 2 in accordance with his or her motion corresponding to the weight shift, and hence the inclination of the user 190 and the movement direction in the virtual space 2 are synchronized with each other similarly to the case of the forward inclination. As a result, occurrence of a so-called VR sickness may be suppressed or avoided.

As described above, according to at least one embodiment of this disclosure, the movement direction of the virtual user in the virtual space 2 is determined based on the direction in which the user 190 is inclined in the real space, and hence the inclination of the user 190 and the movement direction in the virtual space 2 are synchronized with each other. As a result, even when the virtual user is moved in the virtual space 2, the VR sickness may be reduced or prevented from occurring to the user 190 that visually recognizes the image at this time. The features described in the embodiments above may be combined as appropriate. For example, regarding the forward or backward component when the user 190 maintaining the horizontal direction inclines the board 180, the movement distance may be calculated so that the virtual user moves forward or backward in the direction of the reference line of sight 5 of the virtual camera 1 in the virtual space 2, and the virtual camera 1 may be rotated about the yaw direction (v axis) in accordance with the degree of inclination in which the user inclines the board 180 to the right side or the left side.

It is to be understood that the embodiments disclosed above are merely examples in all aspects and in no way intended to limit this disclosure. The scope of this disclosure is defined by the appended claims and not by the description made above, and all the modifications made within the scope and spirit equivalent to those of the appended claims are included in this disclosure.

The following contents are supplementary notes for this disclosure.

(Item 1)

A method of providing a virtual space to a head mounted display device by a computer. The method includes defining a virtual space. The method further includes detecting a direction in which a user of the head mounted display device is inclined. The method further includes determining a movement direction of the user in the virtual space based on the detected direction in which the user is inclined. The method further includes causing the head mounted display device to display a field of view of the user in the virtual space so that the field of view is moved in the determined movement direction of the user.

(Item 2)

A method according to Item 1, in which the determining of the movement direction includes determining the movement direction in accordance with a time for which inclination of the user is continued.

(Item 3)

A method according to Item 1, in which the determining of the movement direction includes determining the movement direction in accordance with the direction which the user is inclined.

(Item 4)

A method according to any one of items 1 to 3, further including determining a movement distance of the user in the virtual space based on detected inclination of the user. The causing of the head mounted display device to display a field of view includes causing the head mounted display device to display the field of view of the user so that the field of view is moved by the movement distance in the movement direction.

(Item 5)

A method of providing a virtual space to a head mounted display device by a computer. The method includes defining a virtual space. The method further includes detecting inclination of a user of the head mounted display device is inclined. The method further includes determining a movement distance of the user in the virtual space based on the detected inclination of the user. The method further includes causing the head mounted display device to display a field of view of the user in the virtual space so that the field of view is moved in the determined movement distance of the user.

(Item 6)

A method according to Item 4 or 5, in which the determining of the movement distance includes determining the movement distance in accordance with a time for which the inclination of the user is continued.

(Item 7)

A method according to Item 4 or 5, in which the determining of the movement distance includes determining the movement distance in accordance with a degree of the inclination of the user.

(Item 8)

A method according to any one of items 1 to 7, in which the detecting of the inclination of the user includes a step of detecting an acceleration based on a posture or a motion performed by the user through weight shift.

(Item 9)

A method according to Item 8, in which the detecting of the inclination of the user includes detecting a load applied from the user.

(Item 10)

A non-transitory computer readable medium configured to store instructions for causing a computer to execute the method of any one of Items 1 to 9.

(Item 11)

A system including a head mounted display device. The system further includes a computer configured to provide a virtual space to the head mounted display device. The system further includes a sensor configured to detect that a user of the head mounted display device is inclined. The computer includes a memory configured to store a series of commands. The computer further includes a processor configured to execute the series of commands. The processor is configured to, when the processor executes the series of commands define a virtual space. The processor is further configured to detect a direction in which the user of the head mounted display device is inclined. The processor is further configured to determine a movement direction of the user in the virtual space based on the direction in which the user is inclined. The processor is further configured to cause the head mounted display device to display a field of view of the user in the virtual space so that the field of view is moved in the determined movement direction of the user.

(Item 12)

A system according to Item 11, in which the processor is further configured to determine a movement distance of the user in the virtual space based on detected inclination of the user. The processor is further configured to cause the head mounted display device to display a field of view by causing the head mounted display device to display the field of view of the user so that the field of view is moved by the movement distance in the movement direction.

(Item 13)

A system including a head mounted display device. The system further includes a computer configured to provide a virtual space to the head mounted display device. The system further includes a sensor configured to detect inclination of a user of the head mounted display device. The computer includes a memory configured to store a series of commands. The computer includes a processor configured to execute the series of commands. The processor is configured to, when the processor executes the series of commands, define a virtual space. The processor is further configured to detect the inclination of the user of the head mounted display device. The processor is further configured to determine a movement distance of the user in the virtual space based on the detected inclination of the user. The processor is further configured to cause the head mounted display device to display a field of view of the user in the virtual space so that the field of view is moved by the determined movement distance of the user.

One of ordinary skill in the art would understand that the embodiments disclosed above are merely examples in all aspects and in no way intended to limit this disclosure. The scope of this disclosure is defined by the appended claims and not by the description made above, and that all the modifications made within the scope and spirit equivalent to those of the appended claims are included in this disclosure.

What is claimed is:

1. A method comprising:
defining a virtual space, wherein the virtual space comprises a virtual camera;
detecting a first inclination using a first sensor;
setting a field of view direction in the virtual space based on the detected first inclination;
detecting a second inclination using a second sensor different from the first sensor wherein detecting the second inclination comprises detecting an orientation of a board using the second sensor attached to the board, and the board is configured to support a user;
determining a movement distance of the virtual camera based on the detected second inclination; and
displaying a field of view image based on the field of view direction and the movement distance.

2. The method according to claim 1, further comprising:
determining a movement direction of the virtual camera based on the detected second inclination, wherein the field of view image is based on the movement direction.

3. The method according to claim 1, wherein detecting the first inclination comprises detecting an inclination of a head of a user using the first sensor in a head mounted display (HMD).

4. The method according to claim 1, wherein the board is a sitting board, and the second sensor is in the sitting board.

5. The method according to claim 2, wherein the determining the movement direction comprises determining the movement direction based on the detected first inclination.

6. The method according to claim 1, wherein the board is configured to support user in a standing position.

7. The method according to claim 1, wherein the detecting the second inclination comprises detecting a user touching at least one touch sensor of a plurality of touch sensors.

8. The method according to claim 1, wherein the displaying the field of view image comprises displaying the field of view image using a HMD, the HMD comprises the first sensor.

9. A system comprising:
a head mounted display (HMD), wherein the HMD comprises a first sensor;
a supporting device configured to support a user, wherein the supporting device comprises a second sensor in a board for supporting the user;
a non-transitory computer readable medium configured to store instructions thereon; and
a processor connected to the non-transitory computer readable medium, wherein the processor is configured to execute the instructions for:
defining a virtual space, wherein the virtual space comprises a virtual camera;
detecting a first inclination based on a signal from the first sensor;
setting a field of view direction in the virtual space based on the detected first inclination;
detecting a second inclination based on a signal from the second sensor;
determining a movement distance of the virtual camera based on the detected second inclination; and
instructing the HMD to display a field of view image based on the field of view direction and the movement distance.

10. The system according to claim 9, wherein the processor is configured to execute the instructions for:
determining a movement direction of the virtual camera based on the detected second inclination, and
instructing the HMD to display the field of view image is based on the movement direction.

11. The system according to claim 1, wherein the first sensor is configured to detect an inclination of a head of the user.

12. The system according to claim 9, wherein the supporting device is configured to support the user sitting on the board.

13. The system according to claim 10, wherein the processor is configured to execute the instructions for:
determining the movement direction of the virtual camera based on the detected first inclination.

14. The system according to claim 9, wherein the second sensor comprises a plurality of touch sensors.

15. The system according to claim 14, wherein a first touch sensor of the plurality of touch sensors is located on a first side of the supporting device, and a second touch sensor of the plurality of touch sensors is located on a second side, opposite the first side, of the supporting device.

16. The system according to claim 9, wherein the supporting device comprises:
a flat top surface; and
a curved bottom surface.

17. A method comprising:
defining a virtual space, wherein the virtual space comprises a virtual camera;
displaying a field of view image using a head mounted display based on a position of the virtual camera in the virtual space;
detecting a first inclination using a first sensor in the HMD;
setting a field of view direction in the virtual space based on the detected first inclination;
detecting a second inclination using a second sensor in a supporting device configured to physically support a user;
determining a movement direction of the virtual camera based on the detected second inclination;
determining a movement distance of the virtual camera based on the detected second inclination; and
updating the field of view image based on the field of view direction, the movement direction and the movement distance.

18. The method according to claim 17, wherein detecting the second inclination comprises detecting an orientation of a sitting board configured to support a user, and the second sensor is in the sitting board.

19. The method according to claim 17, wherein the determining the movement direction comprises determining the movement direction based on the detected first inclination.

20. The method according to claim 17, wherein the detecting the second inclination comprises detecting the user touching at least one touch sensor of a plurality of touch sensors.

* * * * *